United States Patent
Fujieda

(10) Patent No.: US 7,239,740 B1
(45) Date of Patent: Jul. 3, 2007

(54) IMAGE PROCESSING APPARATUS AND METHOD, MEDIUM STORING PROGRAM FOR IMAGE PROCESSING, AND INSPECTION APPARATUS

(75) Inventor: Shiro Fujieda, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/445,304

(22) PCT Filed: Jul. 4, 1999

(86) PCT No.: PCT/JP99/01845

§ 371 (c)(1), (2), (4) Date: Dec. 6, 1999

(87) PCT Pub. No.: WO99/52072

PCT Pub. Date: Oct. 14, 1999

(30) Foreign Application Priority Data

Apr. 7, 1998 (JP) ................... 10-112777

(51) Int. Cl.
G06K 9/46 (2006.01)
G06K 9/00 (2006.01)
(52) U.S. Cl. ..................... 382/150; 382/190
(58) Field of Classification Search ............... 382/141, 382/145, 147, 149, 150, 199, 202, 203, 190, 382/197, 201, 242; 345/443; 348/87
See application file for complete search history.

(56) References Cited

U.S. PATENT DOCUMENTS

| | | | |
|---|---|---|---|
| 4,974,261 A * | 11/1990 | Nakahara et al. ........... 348/128 |
| 5,093,869 A * | 3/1992 | Alves et al. ................. 382/103 |
| 5,142,592 A * | 8/1992 | Moler ........................ 382/200 |
| 5,887,082 A * | 3/1999 | Mitsunaga et al. ......... 358/517 |
| 5,898,440 A * | 4/1999 | Tachibana ................... 345/443 |
| 5,903,660 A * | 5/1999 | Huang et al. ............... 382/132 |
| 5,926,557 A * | 7/1999 | King et al. ................. 382/149 |

(Continued)

FOREIGN PATENT DOCUMENTS

JP A-8-193282 8/1988

(Continued)

OTHER PUBLICATIONS

O'Gorman et al., Finding Picture Edges Through Collinearity of Feature Points, Proceedings of the International Joint Conference on Artifical Intelligence, Aug. 1973, pp., 543-555.

(Continued)

*Primary Examiner*—Samir Ahmed
(74) *Attorney, Agent, or Firm*—Dickstein Shapiro LLP

(57) ABSTRACT

In a gray level image, the direction and the magnitude of a level gradient are found for each of pixels. With respect to the pixel having a level gradient whose magnitude exceeds a predetermined value, a line segment having a predetermined length is drawn in the direction of the level gradient from the pixel or a position spaced apart from the pixel by a predetermined distance. The luminance level of the line segment corresponds to the magnitude of the level gradient. A portion where a lot of line segments are overlapped with one another or a portion where the line segments are concentrated is detected, to recognize the center, the corners, etc. of an object appearing on the image.

55 Claims, 18 Drawing Sheets

U.S. PATENT DOCUMENTS

| | | | | |
|---|---|---|---|---|
| 6,154,566 | A | * 11/2000 | Mine et al. | 382/219 |
| 6,292,582 | B1 | * 9/2001 | Lin et al. | 348/126 |
| 6,408,109 | B1 | * 6/2002 | Silver et al. | 382/190 |
| 6,427,030 | B1 | * 7/2002 | Williams et al. | 382/252 |

FOREIGN PATENT DOCUMENTS

| | | | |
|---|---|---|---|
| JP | 1-102687 | | 4/1989 |
| JP | A-03-239902 | | 10/1991 |
| JP | A-63-19087 | | 11/1994 |
| JP | 7-027096 | | 1/1995 |
| JP | A-8-272980 | | 10/1996 |
| JP | 9-54828 | * | 2/1997 |
| JP | 9-229646 | | 9/1997 |
| JP | 10-47922 | | 2/1998 |
| JP | 10-260267 | | 9/1998 |

OTHER PUBLICATIONS

Diaz et al., A Gray-Level 2D Feature Detector Using Circular Statistics, Pattern Recognition Letters, North-Holland Publ. Amsterdam, NL, Vo. 18, No. 11-13, Nov. 1997, pp., 1083-1089.

Kimme et al., Finding Circles by an Array of Accumulators, Communications of the Association for Computing Machinery, Association for Computing Machinery, New York, vol. 18, No. 2, Feb. 1975, pp. 120-122.

* cited by examiner $dx(x,y)<0$
$dy(x,y)>0$
$0<Ec(x,y)<90$ $dx(x,y)>0$
$dy(x,y)>0$
$90<Ec(x,y)<180$ $dx(x,y)>0$
$dy(x,y)<0$
$180<Ec(x,y)<270$ $dx(x,y)<0$
$dy(x,y)<0$
$270<Ec(x,y)<360$ $dx(x,y)>0$
$dy(x,y)=0$
$Ec(x,y)=180$ $dx(x,y)=0$
$dy(x,y)<0$
$Ec(x,y)=270$ $dx(x,y)<0$
$dy(x,y)=0$
$Ec(x,y)=0$ $dx(x,y)=0$
$dy(x,y)>0$
$Ec(x,y)=90$

IMAGE PROCESSING APPARATUS AND METHOD, MEDIUM STORING PROGRAM FOR IMAGE PROCESSING, AND INSPECTION APPARATUS

TECHNICAL FIELD

The present invention relates generally to an apparatus for and a method of processing a gray level image, a medium having a program for image processing stored thereon, and an apparatus for inspecting the presence or absence, the position, the shape, the direction, etc. of an object.

BACKGROUND ART

When an object having a given contour shape is subjected to recognition processing on a gray level image, a method of binarizing the gray level image representing a recognition object at a predetermined threshold has been conventionally known. The recognition processing based on binary data is easily affected by illumination variations, shading and so forth. Particularly when an X-ray transmitting image is processed, as in the inspection of a void in a soldered portion on a substrate, a lot of noises are produced on the image, so that a contrast between the object and a background is decreased. Accordingly, the image may, in some cases, be unrecognizable.

A method of subjecting a gray level image to normalized correlation operation processing using a model image of an object, to recognize the position of the object has been known. In recognition processing using a normalized correlation operation, the model image of the object must be previously set. Therefore, the method is unsuitable for a case where the size of the object varies. Further, the normalized correlation operation must be executed in each of scanning positions on the image, thereby increasing a hardware configuration and processing time. Particularly in order to measure the direction of the object, it is necessary to rotate the model image a predetermined angle at a time and execute the normalized correlation operation for each rotation angle position, thereby increasingly complicating a device configuration and processing.

In order to measure the position and the direction of an object in a contour shape having corners, for example, a chip component on a substrate, a method of tracking an edge on an image to specify straight lines corresponding to the contours of the object, then finding an equation of each of the straight lines, and further recognizing the position of a point of intersection of the plurality of straight lines found by the equations as the position of the component may, in some cases, be used. However, this method complicates processing such as the tracking of the edge and the operation of the equations.

With respect to an object having boundary lines whose shapes are point-symmetrical or an object like a polygon at least two sets of opposite sides of which are parallel, a method of measuring the position and the shape of the object using the direction of each of edges appearing on an image has been proposed (see JP-A-9-229646).

According to this method, a representative point of the object can be extracted with high precision without being affected by illumination variations and complicating a device configuration. In this method, however, a recognition object is limited to a polygon having boundary lines whose shapes are point-symmetrical or a polygon at least two sets of opposite sides of which are parallel. Accordingly, it is impossible to recognize an object whose contours are asymmetrical. A representative point finally found is a point in the contours of the object. Accordingly, it is difficult to apply this method to processing for extracting the corners of an object that is a polygon and measuring the direction of the object.

DISCLOSURE OF INVENTION

An object of the present invention is to make it possible to stably process even a low-contrast image and an image including noises.

Another object of the present invention is to make it unnecessary to set a model image and make an operation performed by an operator simple.

Still another object of the present invention is to make a configuration and processing simple.

A further object of the present invention is to make it possible to make restrictions on an object as few as possible.

An image processing apparatus according to the present invention comprises gradient calculation means for calculating at least the direction of the level gradient of a processing unit in given image data including a plurality of pixels, the pixels respectively having level data; line segment formation means for producing line segment image data representing a line segment having a direction corresponding to the direction of the level gradient which is calculated by the gradient calculation means and a given length; and line segment image storage means for storing the line segment image data produced by the line segment formation means.

Data representing the level of each of the pixels is gray level data represented by two or more bits.

Although the processing unit is basically a pixel, it may be a block composed of a plurality of pixels.

The data representing the level of the pixel represents brightness (darkness) or density if it is luminance data. Consequently, the level gradient can be also represented using terms such as "brightness gradient", "darkness gradient", and "density gradient". The image data is not limited to the luminance data. For example, it may be data representing a color (for example, red, green, or blue). In this case, the level gradient will represent the change in the density of the color. In either case, the direction of the level gradient is the direction of the maximum gradient (the magnitude of the level gradient takes a positive or negative maximum value).

A direction corresponding to the direction of the level gradient includes various modes depending on the purposes of image processing. The first is the direction in which the level increases (a positive direction), and the second is the direction in which the level decreases (a negative direction). The third is a direction perpendicular to the direction of the level gradient. The direction perpendicular to the direction of the level gradient includes two directions. It may be either one or both of the directions.

As an example, there is an image (an image of an object) representing a circle (or a shape close thereto), as shown in FIG. 1a. It is assumed that the inside of the circle is relatively bright, and a background is relatively dark. A level gradient that is not zero is calculated in the position (a pixel) of the contour C of the circle or its vicinity. (For convenience of drawing, it should be understood that although the contour C is clearly drawn by a broken line, the level (brightness, darkness, or density) of image data in the vicinity of the contour C is generally changed more rapidly, as compared with those in the other portions. It is assumed that the change in the level takes the maximum value in a direction perpendicular to the direction of the tangent of the contour C. (The same is true for the other example, described later.) It is assumed that the brighter the image is, the higher the level of the image data is (actually, the reverse is, of course, possible). When it is assumed that a line segment having a predetermined length (described later) is formed in the direction in which the level increases (a positive direction) from the pixel at which the level gradient which is not zero has been calculated, a lot of line segments L which are directed to the center of the circle from the contour C are drawn, as shown in FIG. 1b. Consequently, the position of the contour C or the presence of the circle becomes clear. If the line segment L is made longer, the center of the circle is found. Contrary to this, when it is assumed that a line segment having a suitable length is formed in the direction in which the level decreases (a negative direction) from the pixel at which the level gradient which is not zero has been calculated, a lot of line segments L directed toward the outside of the circle radially from the contour C are drawn, as shown in FIG. 1c. The position of the contour C or the presence of the circle becomes clear.

As another example, there is an image (an image of an object) representing a rectangle, as shown in FIG. 2a. It is assumed that the inside of the rectangle is relatively bright, and a background is relatively dark. A level gradient that is not zero is calculated at a pixel representing the contour C of the rectangle. The direction of the level gradient that is not zero is a direction perpendicular to the contour C. When it is assumed that line segments L having a predetermined length are formed from the pixel at which the level gradient that is not zero has been calculated in two directions perpendicular to the direction of the level gradient, the line segment L which is overlapped with the contour C and the line segment L extending onto an extension of the contour C are drawn, as shown in FIG. 2b. The presence of the rectangle, the position of the contour C, the direction of the rectangle and so forth become clear.

Image processing, for example, detection or recognition of an object image, described later (detection of the presence, detection of the position, or detection of the direction) or display of a line segment image is performed on the basis of the line segment image data stored in the line segment image storage means.

According to the present invention, the level gradient of image data is calculated for each processing unit (for example, for each pixel) on a given image, and a line segment image representing a line segment having a direction corresponding to the calculated direction of the level gradient and a given length is obtained. Even if the contour of an image is not necessarily clear, a clear line segment is obtained. Consequently, even a low-contrast image and an image including noises can be subjected to stable image processing. The configuration or the processing is also relatively simple. A basic pattern (a model image) need not be set.

In one embodiment of the present invention, there is provided image storage means for storing the given image data. The gradient calculation means calculates a level gradient for each processing unit with respect to the image data stored in the image storage means.

The image storage means does not necessarily need to temporarily store all image data. For example, it is also possible to calculate a level gradient in real time while shifting image data along a plurality of scanning lines which are adjacent to one another on a plurality of line memories.

The above-mentioned given image data may be image data of one frame which is picked up by a video camera (or a television camera) (including a still camera), image data corresponding to one screen which is stored in a memory, or image data in a part region extracted from the image data corresponding to one screen. The region will be generally defined by setting a window.

In one embodiment of the present invention, there is further provided image data extraction means for extracting image data in a processing region set in input image data and feeding the extracted image data to the gradient calculation means.

The input image data includes image data obtained by picking up an object using a video camera, image data stored in a memory, image data transmitted from another apparatus, and so forth.

In a preferred embodiment of the present invention, there is further provided means for setting the processing region.

The setting means includes various modes. The first is a mode of displaying an image represented by input image data on a display device, and designating a portion to be a processing object (a region including an object image) using a cursor or the like on a display screen of the display device. The setting means will include a display device and an input device for providing input for moving the cursor.

The second is a mode of setting a region of a size previously determined (or inputted) at a predetermined position. In this case, the setting means will include storage means for storing the position and the size and means for determining a processing region on image data on the basis of the storage means.

A line segment formed by the line segment formation means may be represented by image data at a gray level (two or more bits) or image data at a binary level. When the line segment is represented at the gray level, the level may be fixed or variable. In the case of the binary level, line segment image data takes a value which is either "1" or "0". The line segment image data may be expressed by data representing the initial point (coordinates), the terminal point (coordinates), and the level (value) of the line segment.

In a preferred embodiment, the gradient calculation means calculates the magnitude of the level gradient in addition to the direction of the level gradient. In this case, it is preferable that the line segment formation means produces line segment image data having a level (brightness, darkness, or density (including the density of a color) corresponding to the calculated magnitude of the level gradient. Consequently, a line segment is drawn at the level corresponding to the magnitude of the level gradient.

In a more preferred embodiment, the magnitude of the level gradient which is calculated by the gradient calculation means and a predetermined threshold level are compared with each other, to produce a line segment image only when the magnitude of the level gradient is not less than the predetermined threshold level (the level of the line segment image may be fixed or a value corresponding to the magnitude of the level gradient, as described above). Since the level gradient has a positive or negative value, as described above, it should be herein understood that it is judged whether or not the absolute value of the level gradient is not less than the predetermined threshold (a positive value).

When the calculated level gradient is low, no line segment image is produced to avoid affection of small level changes and noises. The predetermined threshold may be determined from the point of view of whether or not the small level changes and the noises are excluded from a processing object as disturbances.

In FIG. 1b, the length of the line segment is set to a small value. When the length of the line segment is larger than the radius of the circle, a lot of line segments are drawn in an overlapped state at the center and its vicinity, as shown in FIG. 1d. (In FIGS. 1d and 3b, the number of line segments is decreased for easy understanding.)

There are two methods of storing line segment image data in line segment image storage means for storing images of a lot of line segments.

The first is a method of adding new line segment image data (level data) to line segment image data (level data) (including zero) already stored at each of the pixels and storing the result of the addition. The line segment image storage means shall comprise addition means. This method is applicable to both of a case where the line segment image data is represented at a gray level and a case where it is represented at a binary level. The addition includes processing for converting new line segment image data (for example, multiplying the line segment image data by a coefficient) and adding the converted line segment image data. With respect to the pixel at which the line segments are drawn in an overlapped state, the level of the image data is increased (accumulated) every time the line segment is overlapped with the others.

The second is a method of storing new line segment image data without subjecting the line segment image data to addition processing. As a result, with respect to the pixel at which image data (excluding zero) representing a line segment image has already been stored, the stored data is maintained as it is (the new line segment image data may be overwritten or may not be written). Only with respect to the pixel (which is zero) at which no image data is stored, new line segment image data for the pixel is newly written. Although the method is also applicable to both of a case where the line segment image data is represented at a gray level and a case where it is represented at a binary level, it is particularly effective for the case where it is represented at a binary level. For example, when the line segment image data is represented by a binary number "1", image data which is represented by "1", are concentrated in a portion where line segments are concentrated.

There are some modes as to the length of a line segment to be formed and the positions of the initial point and the terminal point of the line segment when a gradient level which is not zero is calculated.

The first is a mode of producing a line segment having a given length in a direction corresponding to the calculated direction of a level gradient from the position of a processing unit (the center of a pixel or a block), as described with reference to FIGS. 1b to 1d. In this case, the length of the line segment may be previously set or inputted.

The second is a mode of giving the distance d from the position of a processing unit (the center of a pixel or a block) e to the initial point of a line segment L and the distance D from the position e of the processing unit to the terminal point of the line segment L. In this case, the line segment formation means calculates the positions of the initial point and the terminal point using the given distances d and D and the calculated direction of a level gradient, and produces the line segment L from the calculated initial point to the calculated terminal point in a direction corresponding to the calculated direction of the level gradient.

FIG. 3b illustrates an example of a line segment L drawn when a value which is smaller than the radius of a circle and is not zero is used as the distance d and a value which is larger than the radius of the circle and is smaller than the diameter thereof is used as the distance D. FIG. 3c illustrates an example in which both the distances d and D are set to a value equal to the radius of the circle. A line segment L to be produced is a point (one pixel) (the point shall be included in the line segment). FIG. 3d illustrates an example in which d=0 and D=∞ (infinity) and a line segment is drawn outside a circle. A processing region w containing the circle is set, and the boundary of the processing region W is the position where the distance equals infinity. In other words, a line segment having a length of infinity is drawn from the position of a processing unit.

The length of the line segment, the distances d and D, etc. may be determined depending on the purposes of processing.

In a preferred embodiment, there is further provided means for setting or inputting the length of the line segment, the distances d and D, etc. A user may only perform an operation for setting or inputting the values. Accordingly, the operation is easy. The values may, of course, be previously set depending on the purpose of processing.

In order to detect the presence or absence of an object image in a particular shape or of a size (a shape or a size in an allowable range) and detect the direction or the position of its center, for example, the image processing apparatus comprises, in a preferred embodiment, means for detecting a portion where line segments represented by the line segment image data stored in the line segment image storage means are concentrated. The detection means is applied to both of a case where the line segment image data is written into the line segment image storage means upon being added and a case where it is written without being added. However, it is particularly effective for the line segment image storage means for storing the line segment image data represented at a binary value without adding the line segment image data.

As an example, in a region or an area of a suitable size (for example, 10 pixels by 10 pixels), when the number of pixels at which a line segment exists (a pixel at which a line segment is drawn or a pixel having data representing a line segment) is large (when it exceeds a predetermined threshold), it can be said that the region is a portion where the line segments are concentrated. The region is scanned over a processing range (region).

In another preferred embodiment, the image processing apparatus comprises means for detecting the position of the pixel having the maximum of the levels of the line segment image data stored in the line segment image storage means. The detection means is effective for the line segment image storage means for storing the line segment image data while adding the line segment image data.

It is preferable that the image processing apparatus further comprises means for judging whether or not the maximum level of the result of addition (the result of accumulation) of the line segment image data exceeds a predetermined threshold.

Detection of the presence (position) of the portion where the line segments are concentrated, detection of the position of the pixel having the maximum level, or detection of the presence (position) of the maximum level exceeding a predetermined threshold by the detection means is applied to various types of inspections. The threshold will be determined by trial-and-error depending on the purpose of the inspection.

In the example shown in FIG. 3b, for example, the presence and the position of a circle having a certain radius (or a radius having a value close thereto) or a shape close thereto (an object having such a shape) are detected. In a case where a circle having a radius from a to b (a<b) or a shape close thereto is detected, a radius a may be employed as the distance d from a processing unit (a pixel, etc.) to the initial point of a line segment (d=a), and a radius k may be employed as the distance D from the processing unit (the pixel, etc.) to the terminal point of the line segment (D=b). So long as the radius of a circular shape (an object) is in a range from a to b, line segments are concentrated in the vicinity of its center, or the maximum level exceeds the threshold. Accordingly, it is judged that a circle whose center is a portion where the line segments are concentrated (or a shape close thereto) exists. Similarly, it is possible to detect a shape or an object having a circular arc-shaped contour.

In the example shown in FIG. 3c, when there exists a circle having a radius r of r=d=D (or a shape close thereto), line segments (points) are concentrated at its center, or the maximum level exceeds a threshold. Accordingly, it is possible to confirm the presence of such a circle and the position of its center. The example is applicable to not only the inspection of the position of the center but also the inspection of the radius and the inspection of out of roundness.

Consequently, image data representing an image of an inspection object can be used for inspecting the presence and the position of an object having a particular shape, the presence and the position of a defective region appearing as a change in the level of the image data, and the like.

According to the image processing apparatus, the position of the circular shape or the object is not necessarily specified sufficiently accurately. However, at least the presence and the rough position of a predetermined circular shape or object become clear. If an accurate position and shape must be specified, therefore, another method such as an edge extracting method may be used.

Still another application is the inspection of a chamfer radius (a radius of curvature) of an object whose corners are chamfered in a round shape. In this case, the minimum value and the maximum value of a tolerance for the chamfer radius may be respectively taken as d and D. Only when the chamfer radius is within the tolerance, therefore, line segments are concentrated, or the maximum level exceeds a predetermined threshold.

In the example shown in FIG. 2b, in a contour and an angle of a rectangle, line segments are concentrated, or the maximum level exceeds a threshold. Consequently, it is possible to detect a linear contour of the rectangle or an object, the presence and the position of a point of intersection of two or more straight lines which is represented by the angle or corner, the direction of arrangement, and so forth. This is applicable to the inspection of the size, the inspection of the area, the inspection of the position of the center of gravity, the inspection of the direction (the direction of a principal axis, the direction of a side, or the direction of a diagonal), etc.

It is also possible to compare the level of image data of each of pixels stored in the line segment image storage means storing accumulated line segment image data with a predetermined threshold, and form (draw) a shape represented by the pixel having data whose level exceeds the threshold. The effect of disturbances such as noises can be eliminated.

In various types of inspections, described above, an object is preferably imaged by a camera. Image data obtained by the imaging is fed to gradient calculation means. The image processing apparatus has imaging means such as a camera.

In a still preferred embodiment, there is provided a display device for displaying a line segment image represented by the line segment image data representing a line segment formed by the line segment formation means or the line segment image data stored in the line segment image storage means. By seeing the display, it is possible to confirm or check the process of processing by the gradient calculation means, the line segment formation means or the line segment image storage means through vision. Only a part of a line segment having a level that is not less than a predetermined threshold may be displayed.

It is preferable that on a display screen of the display device, an image (an object image) picked up by the imaging means or an image (an object image) represented by image data which is a processing object by the gradient calculation means is displayed in addition to the line segment image with the image further overlapped therewith. Further, an edge of the object image may be extracted, and an image represented by the extracted edge may be displayed with the image overlapped with the line segment image. Desirably, it is possible to choose whether or not the object image is displayed and whether or not the edge image is displayed. It goes without saying that both the object image and the edge image may be displayed with the images overlapped with the line segment image.

In a desirable embodiment of the present invention, a mark representing the portion, where the line segments are concentrated, the position of a pixel having the maximum level or the pixel having the maximum level exceeding a threshold, detected in the above-mentioned manner, is displayed with the mark overlapped with the object image or the edge image. The object image and the edge image may be displayed in an overlapped state. Switching can be also performed such that either one of the object image and the edge image is displayed. The line segment image may be displayed with the image further overlapped therewith.

The present invention further provides an image processing apparatus comprising image processing means for calculating at least the direction of the level gradient of a processing unit in given image data, and producing line segment image data representing a line segment having a direction corresponding to the calculated direction of the level gradient; and display means for displaying a line segment image represented by the line segment image data produced by the image processing means.

The process of processing by the image processing means can be visually confirmed or checked through the line segment image displayed on the display device.

The image (the object image) represented by the image data may be displayed with the image overlapped with the line segment image. Alternatively, it is preferable that an edge of the image represented by the image data is extracted, an image represented by the extracted edge is displayed in addition to or in place of the object image represented by the image data. It is also possible to provide means for switching the display of the object image and the display of the edge image.

The present invention further provides a method of performing all the above-mentioned image processing, and a medium storing a program for controlling a computer so as to cause the computer to perform all the image processing.

When the image processing apparatus according to the present invention is defined from another point of view, it is expressed as follows. That is, the image processing apparatus according to the present invention comprises means for extracting a plurality of edges whose level gradients are not less than a predetermined value in given image data; means for setting, for each of the edges, a line segment extending in a direction corresponding to the direction of the extracted edge; and means for detecting the presence or absence of a point of intersection of a plurality of line segments and the position thereof.

The direction of the line segment is typically a direction perpendicular to the direction of the edge or the same direction as the direction of the edge.

It is possible to detect edges with respect to at least two points on the image, set line segments to judge the presence or absence of a point of intersection of the line segments, and calculate, when the point of intersection exists, the position of the point of intersection. The shape, the position, the direction, etc. of the object image can be judged by detecting one or a plurality of points of intersection.

The present invention further provides an inspection apparatus suitable for various types of inspections, described above.

The inspection apparatus comprises image input means for inputting image data representing a processing object; means for calculating at least the direction of the level gradient of a processing unit in the input image data, and producing line segment image data representing a line segment having a direction corresponding to the calculated direction of the level gradient; and detecting the presence or absence of a portion where line segment images are concentrated or are overlapped with one another and the position thereof on the basis of the produced line segment image data.

The direction corresponding to the direction of the level gradient is typically the direction of the level gradient or a direction perpendicular to the direction of the level gradient. It is preferable to produce, only with respect to the level gradient whose magnitude is not less than a predetermined value, the line segment.

A portion where line segment images are concentrated is as described above. The portion where the line segment images are overlapped with one another means a pixel at a point of intersection of the line segments, a pixel at which an accumulated value of line segment image data exceeds a predetermined threshold, a pixel at which the accumulated value is the largest, and a pixel at which the accumulated value is the largest and exceeds the predetermined threshold.

The inspection apparatus according to the present invention is simple in operation. For example, an operator need not set a reference pattern (a model image). Further, it is simple in configuration and processing. The shape, the size, etc. of an inspection object are hardly restricted. It is also applicable to an unclear image or an image which is low in contrast without being affected by disturbances such as illumination variations and noises.

In one embodiment, there is provided a display device for displaying the line segment image on the basis of the line segment image data. The process of producing the line segment image will visually become clear.

It is preferable that an image of the object represented by the input image data is displayed on the display device with the image overlapped with the line segment image.

In another embodiment, there is provided a display device for displaying the detected position of the portion where the line segment images are concentrated or are overlapped with one another on the image of the object represented by the input image data or an image represented by an edge extracted from the input image data.

In order to adapt the inspection apparatus to the purposes of various types of inspections, there is further provided means for inputting data relating to the length of the line segment and the initial point and the terminal point of the line segment.

An inspection apparatus according to the present invention can be utilized for the inspection of the presence or absence and the position of a defective region in an object, the inspection of the presence or absence and the position of a circle or a circular arc in the object, the detection of the center of the circle or the circular arc, the measurement of the radius, the inspection of out of roundness, the inspection of the presence or absence and the position of a side or a corner of the object, and the inspection of the size, the area, the position of the center of gravity, the direction, etc.

The other features or aspects of the present invention will become more apparent in the detailed description of the embodiments with reference to the accompanying drawings.

BEST MODE FOR CARRYING OUT THE INVENTION

An embodiment is directed to an apparatus for processing an X-ray transmitting image of a substrate on which a package of LSI (Large Scale Integration) having terminals of solder balls arranged in an array on lower surface thereof is mounted. A molten solder (including a solder bump) shall be referred to as a solder ball in the present embodiment. The image processing apparatus inspects whether or not a void exists in the solder ball.

Figure 4:
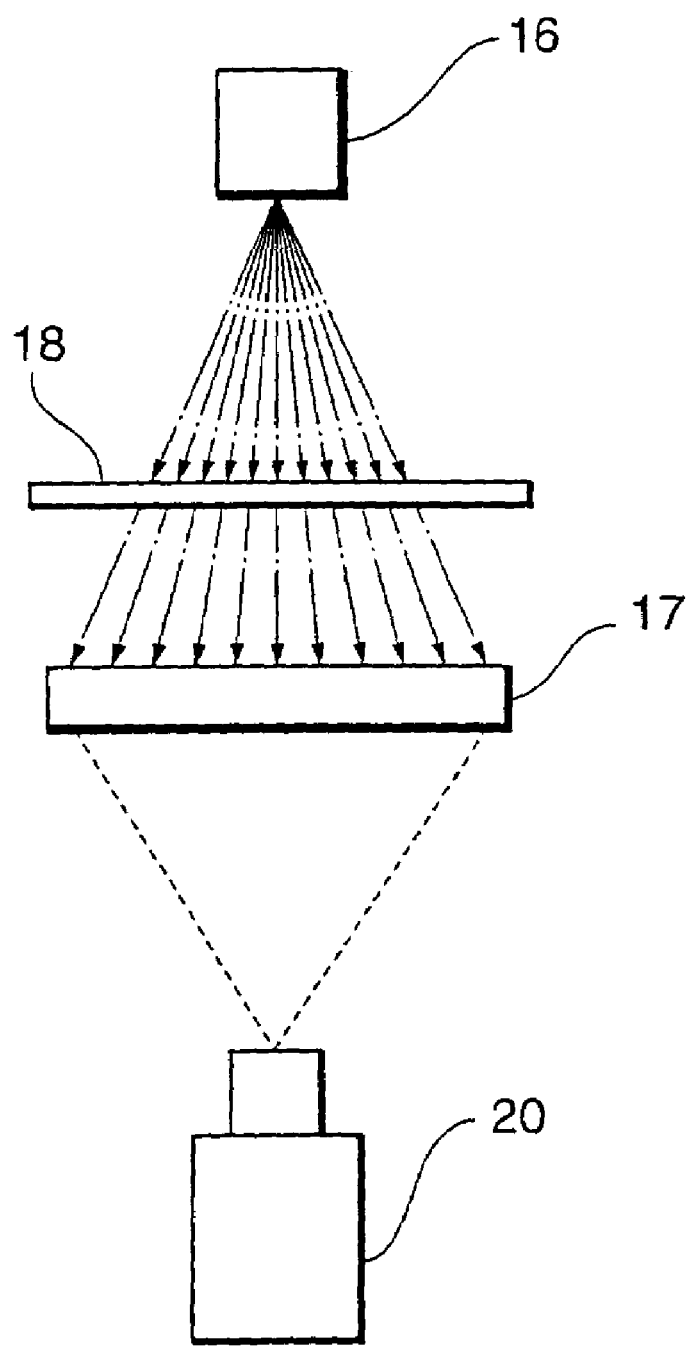
FIG. 4 illustrates a configuration for producing an X-ray transmitting image supplied to an image processing apparatus.

FIG. 4 illustrates a configuration for producing image data fed to the image processing apparatus.

A substrate 18 which is an inspection object is supported between an X-ray irradiation section 16 and an X-ray conversion section 17 by a supporting mechanism (not shown), and a camera 20 is disposed in a position below the X-ray conversion section 17. The X-ray irradiation section 16 irradiates the substrate 18 with X-rays from its very small X-ray generation source. The X-rays which have passed through the substrate 18 are converted into visible light rays in the X-ray conversion section 17. The camera 20 picks up the visible light rays obtained by the conversion, to produce image data representing an X-ray transmitting image representing the internal state of each of solder balls, and feeds the produced image data to the image processing apparatus.

Figure 5:
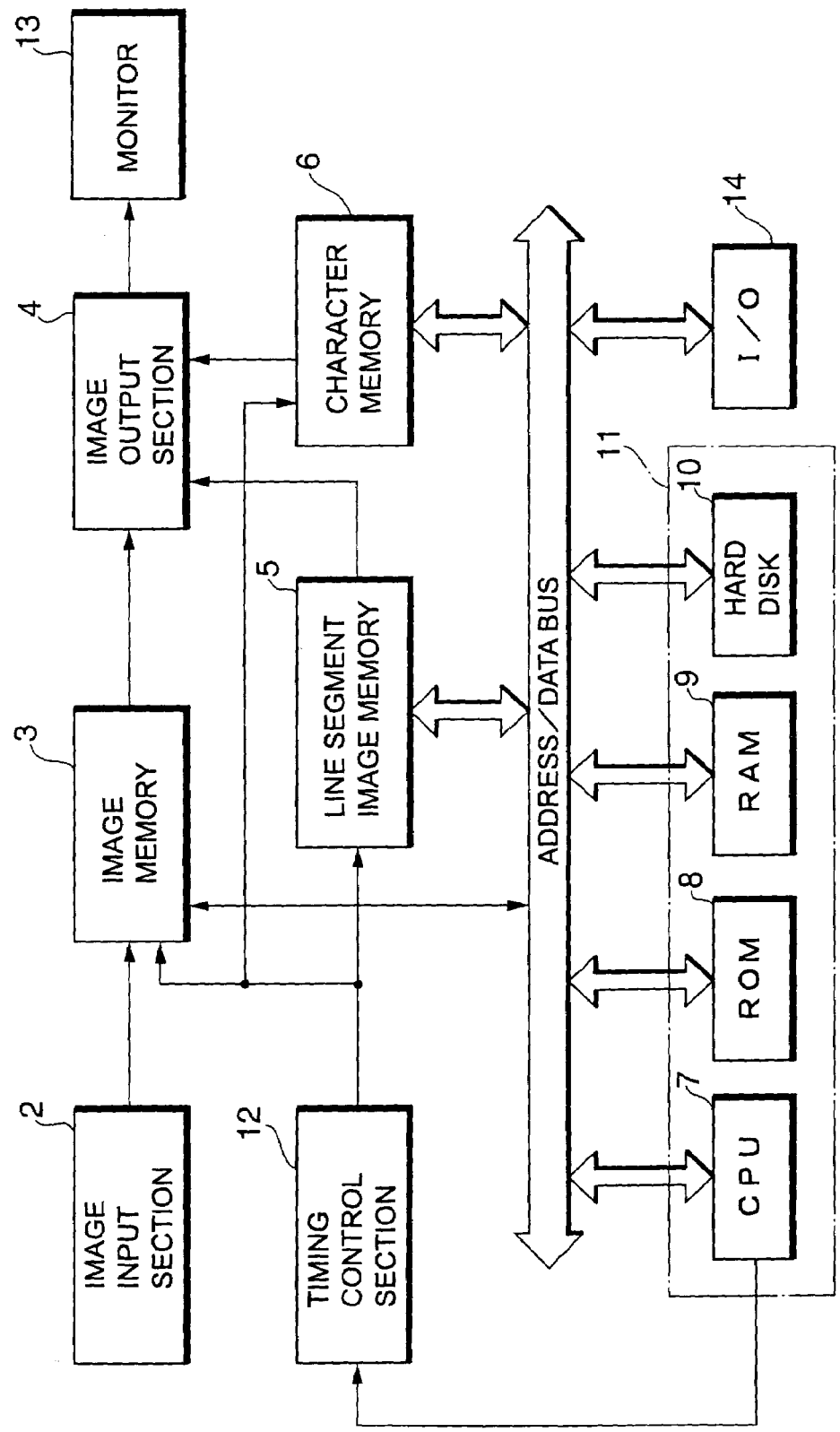
FIG. 5 is a block diagram showing the electrical configuration of an image processing apparatus according to one embodiment of the present invention.

FIG. 5 illustrates the electrical configuration of the image processing apparatus.

The image processing apparatus comprises an image input section 2, an image memory 3, an image output section 4, a line segment image memory 5, a character memory 6, a control section 11, a timing control section 12, a monitor display device 13, an I/O port 14, and so forth.

The image input section 2 comprises an analog-to-digital (A/D) converter for converting an analog image signal from the camera 20 into digital image data. Digital gray level image data produced in the image input section 2 is stored in the image memory 3, and is preserved until the subsequent image data is inputted.

The line segment image memory 5 stores line segment image data representing a line segment image, described later. The line segment image data in the memory 5 is used for purposes such as detection processing of a void and display of the line segment image on the monitor display device 13. When the luminance level of the line segment image, described later, is represented by eight bits, the memory 5 can store 16 bits or 32 bits per pixel.

The character memory 6 stores data such as text data for displaying the result of inspection on the monitor display device 13 and data representing the position where the result of inspection is displayed.

The memories 5 and 6 and the image memory 3 are connected to the control section 11 through an address/data bus, respectively, and outputs the stored data to the image output section 4 in response to an instruction from the control section 11 and a timing signal from the timing control section 12.

The image output section 4 comprises an image synthesis circuit for synthesizing output data from the memories 3, 5, and 6 and a digital-to-analog (D/A) conversion circuit, and produces an image signal for displaying the result of inspection by the circuits and outputs the produced image signal to the monitor display device 13.

The control section 11 is mainly constituted by a CPU 7, a ROM 8 and a RAM 9. The control section 11 further comprises a hard disk 10 in which a control program for causing the CPU 7 to execute a series of procedures for inspection has been installed. The CPU 7 accesses the memories 3, 5 and 6 through the address/data bus on the basis of the control program which has been installed in the hard disk 10, to perform processing for judging whether or not each of the solder balls on the substrate which is an inspection object is good (acceptable) and output the result of the processing to the monitor display device 13.

The I/O port 14 is for connecting input sections such as a keyboard and a mouse and output sections such as an external storage device and a transmission section. Inspection conditions and inspection area setting data, described later, are inputted from the input sections. The final result of the inspection in a form of a file is outputted to the output sections.

Figure 6:
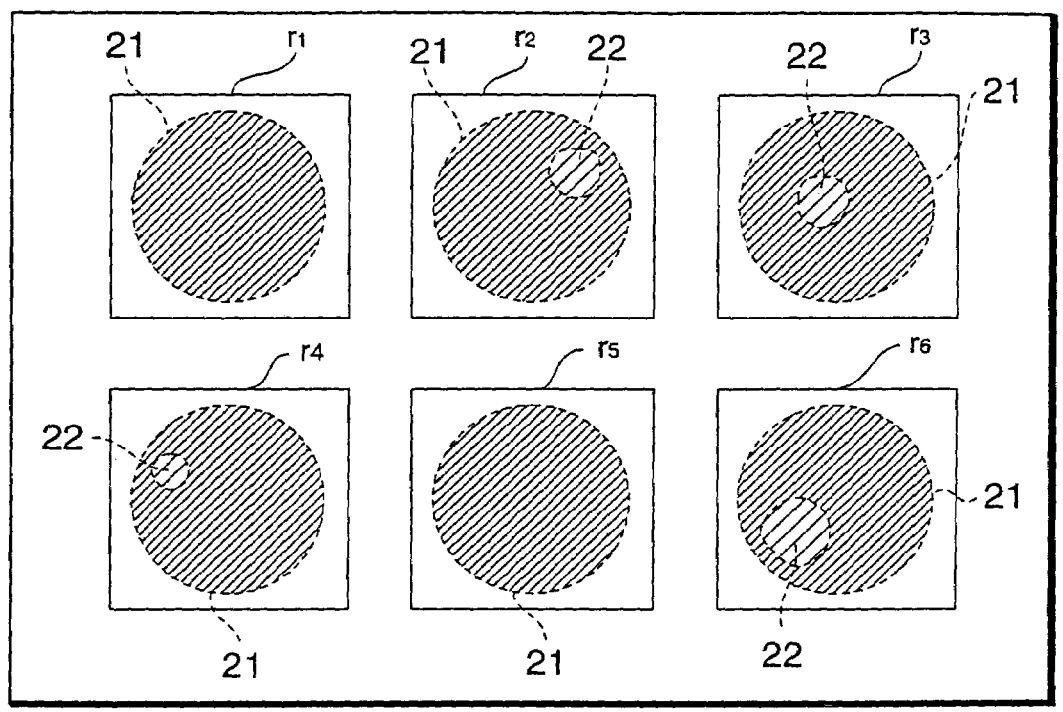
FIG. 6 illustrates an example of an input image.

FIG. 6 illustrates an example of an image represented by gray level image data stored in the image memory 3. Images of a plurality of solder balls 21 appear more brightly than a background (an image of a substrate). On the images of some of the solder balls 21, images of voids 22 inside the solder balls appear. The image of the void 22 is slightly darker than the image of the solder ball 21.

The CPU 7 sets, for each of the solder balls, an inspection area $r_k$ (k=1 to 6) of a size surrounding the solder ball in the input image shown in FIG. 6. In each of the inspection areas $r_k$, the direction and the magnitude of the level gradient of the gray level image data are calculated for each pixel. The CPU 7 further produces a line segment having a direction along the calculated direction of the level gradient and a predetermined length (a line segment is produced only with respect to a case where the magnitude of the level gradient is not less than a predetermined value, as described later). An image of the line segment is also a gray level image, and the level thereof corresponds to the calculated magnitude of the level gradient. Line segment image data thus produced is stored in the line segment image memory 5 (the level thereof is accumulated for each pixel, as described later). The line segment image data may be image data having level data for each pixel, or can be composed of data representing the initial point, the terminal point and the level of the line segment.

When the calculation of level gradients for all pixels in each of the inspection areas and the production of necessary line segment images are terminated, the CPU 7 detects the degree of density of the line segment images or the pixel having the maximum level, compares the maximum level with a predetermined threshold, and finally judges whether or not the image of the void 22 exists in the inspection area.

Before describing the specific procedure for processing in the image processing apparatus, description is made of processing for producing a line segment image and the principle of judgment of the presence or absence of a void based on the line segment image.

In processing for calculating a level gradient in image data, differential processing is performed, for each of pixels in an inspection area, in a local region (area) of a predetermined size which has the pixel as its center, to calculate level gradients along the X-axis and the Y-axis and finally find a level gradient at each of the pixels using the calculated level gradients.

Figure 7:
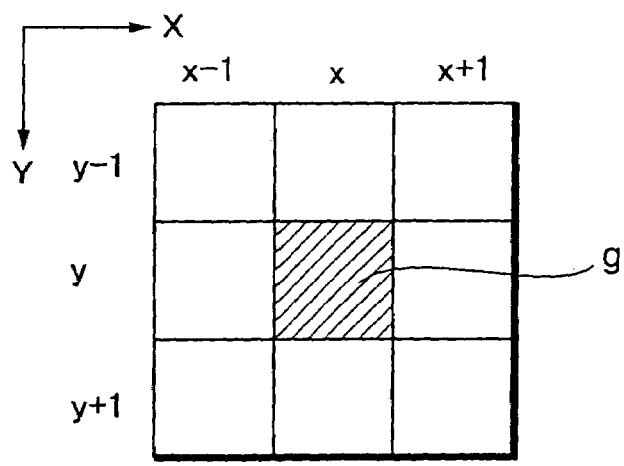
FIG. 7 illustrates an example of a local region for calculating a level gradient.
Figure 8A:
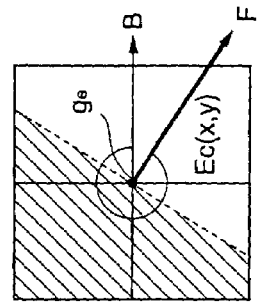
FIGS. 8a to 8h illustrate the relationship among a target pixel, image data in its vicinity, and the direction of a level gradient.
Figure 8B:
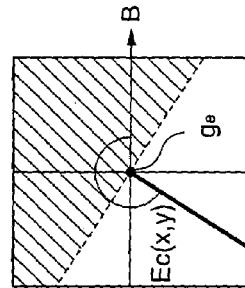
Figure 8C:
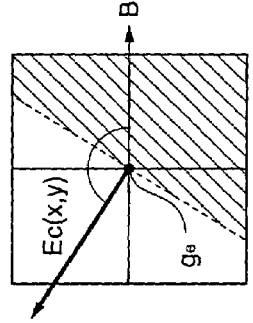
Figure 8D:
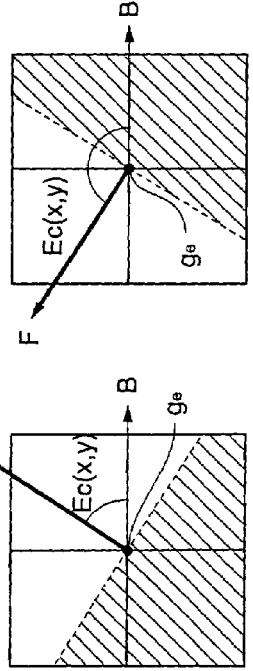
Figure 8E:
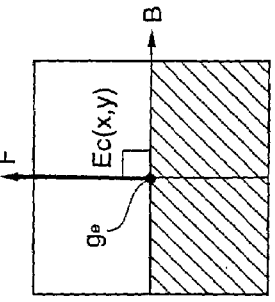
Figure 8F:
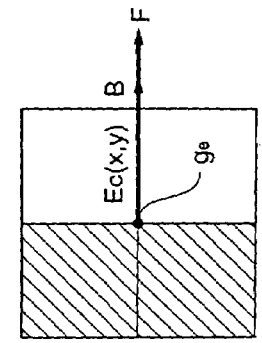
Figure 8G:
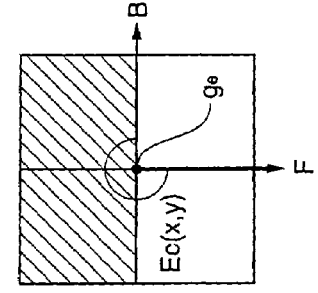
Figure 8H:
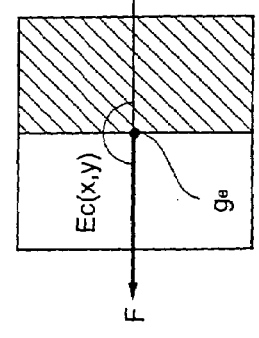

For example, a local region (3 pixels by pixels) is set for a pixel g at a coordinate position (x, y), as shown in FIG. 7. In differential processing by the Sobel method, level gradients dx (x, y) and dy (x, y) along the respective axes are respectively calculated by equations (1) and (2) using a luminance (brightness) level I of each of the pixels:

$$dx(x, y) = \{I(x+1, y-1) + 2 \cdot I(x+1, y) + I(x+1, y+1)\} - \{I(x-1, y-1) + 2 \cdot I(x-1, y) + I(x-1, yx1)\}.$$

$$dy(x,y) = \{I(x-1,y+1) + 2 \cdot I(x,y+1) + I(x+1,y+1)\} - \{I(x-1, y-1) + 2 \cdot I(x,y-1) + I(x+1,y-1)\} \quad \text{Eq. (2)}$$

The level gradients along the X-axis and the Y-axis are respectively represented by vectors having magnitude dx(x, y) and magnitude dy(x,y) and directed toward the X-axis and the Y-axis, respectively. Consequently, a level gradient at the pixel g is represented by synthesizing the vectors toward the X-axis and the Y-axis. The magnitude $E_i(x,y)$ of a composite vector is given by the following equation, and the direction thereof is a direction indicating the maximum gradient.

$$E_i(x,y)=\sqrt{(dx(x,y))^2+(dy(x,y))^2} \qquad \text{Eq. (3)}$$

FIGS. 8a to 8h illustrate the direction of a level gradient depending on a luminance level distribution of a pixel $g_e$ and pixels in its vicinity by taking various examples. A hatched portion has a higher luminance value (is brighter).

A vector F is a composite vector of vectors respectively having level gradients along the X-axis and the Y-axis. In an example as illustrated, the vector F is directed from a high luminance level to a low luminance level. However, the direction of the vector F is determined depending on which direction is selected as the positive direction of the level gradient.

The direction of a level gradient is represented by an angle $E_c(x, y)$ in a counterclockwise direction to the composite vector F from a vector B along the positive direction of the X-axis starting from the pixel $g_e$, assuming that the vector B is at an angle of zero degree.

The vector F is set in any one of angle ranges 0 to 90 degrees, 90 to 180 degrees, 180 to 270 degrees, and 270 to 360 degrees with respect to the reference vector B depending on the magnitude of the level gradient along each of the X-axis and the Y-axis (positive, negative, or zero). The angle $E_c(x, y)$ indicating the direction of the level gradient is calculated by any one of the following equations (4) to (9) depending on conditions by the magnitudes of the level gradients $dx(x, y)$ and $dy(x, y)$ (a unit is degree). The magnitude of the level gradient at the pixel $g_e$ is calculated by the foregoing equation (3) because it corresponds to the length of the vector F.

If $dx(x,y)<0$ and $dy(x,y)>0$, then $E_c(x,y)=-\arctan(dx(x,y)/dy(x,y))$     Eq. (4)

If $dx(x,y)>0$ and $dy(x,y)\neq 0$, then $E_c(x,y)=180-\arctan(dx(x,y)/dy(x,y))$     Eq. (5)

If $dx(x,y)\leq 0$ and $dy(x,y)<0$, then $E_c(x,y)=360-\arctan(dx(x,y)/dy(x,y))$     Eq. (6)

If $dx(x,y)>0$ and $dy(x,y)=0$, then $E_c(x,y)=180$     Eq. (7)

If $dx(x,y)\leq 0$ and $dy(x,y)=0$, then $E_c(x,y)=0$     Eq. (8)

If $dx(x,y)=0$ and $dy(x,y)>0$, then $E_c(x,y)=90$     Eq. (9)

Figure 9:
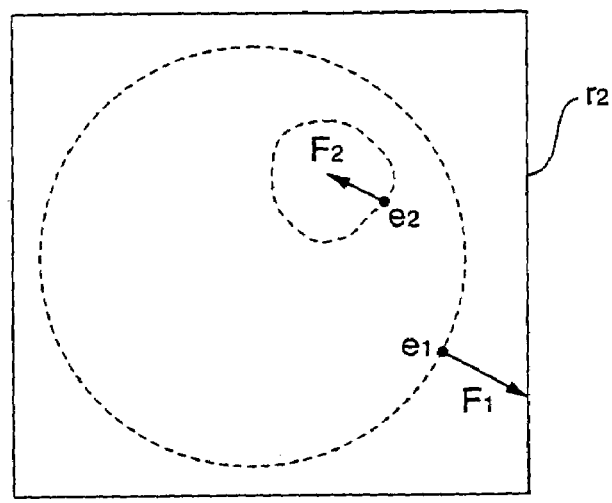
FIG. 9 illustrates an example of the directions of level gradients in an inspection area.

FIG. 9 illustrates only the contours of images in an inspection area $r_2$ which are extracted from the input image shown in FIG. 6, where the contour of an image of a solder ball and the contour of an image of a void are illustrated. Vectors $F_1$ and $F_2$ respectively representing level gradients calculated with respect to representative points $e_1$ and $e_2$ on the contours are also illustrated.

The image of the solder ball is higher in luminance level than a background, so that the vector $F_1$ directed from the point $e_1$ on the contour of the solder ball toward the background is obtained at the point $e_1$. On the other hand, the image of the void is lower in luminance level than the image of the solder ball, so that the level gradient at the point $e_2$ on the contour of the void is represented by the vector $F_2$ directed inward from the position of the point $e_2$.

Figure 10:
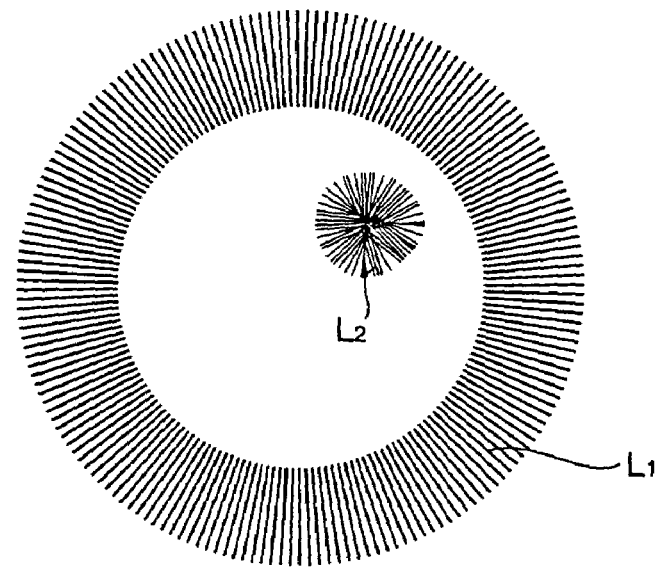
FIG. 10 illustrates a line segment image produced in the inspection area.

FIG. 10 illustrates a drawing of line segments respectively representing the directions of level gradients at all points (pixels) (in a range which can be illustrated) on the contour of the solder ball and the contour of the void which are illustrated in FIG. 9 (it is assumed that the levels of line segment images are constant).

On the contour of the solder ball, all line segments $L_1$ are directed outward (toward the background).

On the other hand, on the contour of the void, all line segments $L_2$ are directed toward the inside of the void. All the line segments $L_2$ cross one another or are overlapped with one another inside the void. The crossing or the overlapping of the line segments $L_2$ are important to judge whether or not the image of the void exists inside the inspection area. In this sense, the length of the line segment or the positions of the initial point and the terminal point of the line segment are important.

FIGS. 9 and 10 are drawn on the assumption that the contours are clear. In an actual image, however, the boundary between portions of the image (a background, a solder ball, and a void) may not, in many cases, be clear. Accordingly, line segments are not directed in a perfect radial shape, and the initial point of the line segment does not necessarily exist on the circumference. However, the line segments drawn in the above-mentioned manner are clear, and the boundary clearly rises from its entire image.

FIGS. 11a to 11d illustrate examples of line segments which differ in the length, the initial point and the terminal point, where line segments obtained as a result of taking representative points $e_p$ and $e_q$ on a circular contour and respectively finding level gradients for the points are illustrated.

Figure 11A:
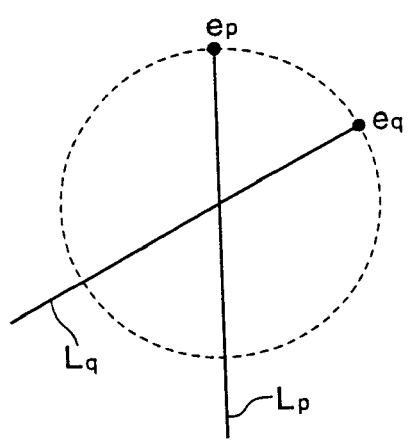
FIGS. 11a to 11d illustrate examples of a method of drawing line segments.

In FIG. 11a, two line segments $L_p$ and $L_q$ respectively start at pixels $e_p$ and $e_q$ which are level gradient calculation objects for producing the line segments, and have lengths larger than the diameter of the circle. When line segments are drawn for all points on a contour, the line segments are overlapped with one another, and an entire image represented by the line segments is larger than the circle (the contour). Although the presence of the circle can be detected, the size and the center thereof, for example, are difficult to detect.

Figure 11B:
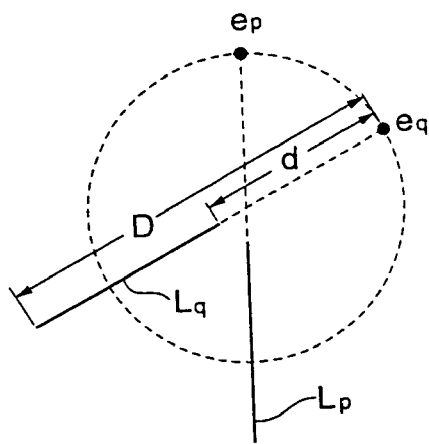

In FIG. 11b, the distance d from a pixel $e_q$ to the initial point of a line segment $L_q$ is larger than the radius of a circle, and the distance D from the pixel $e_q$ to the terminal point of the line segment $L_q$ is larger than the diameter of the circle (the same is true for a line segment $L_p$). The line segments are concentrated in an annular shape around the contour of the circle. Although the presence of the circle can be also detected in this case, the center and the size thereof are difficult to detect.

Figure 11C:
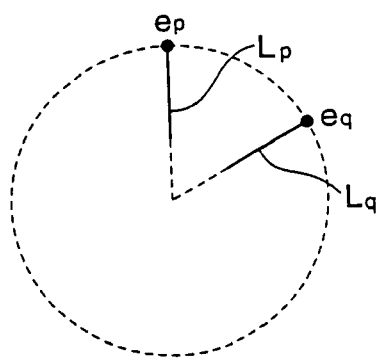

In FIG. 11c, line segments $L_p$ and $L_q$ respectively have pixels $e_p$ and $e_q$ as initial points, and the lengths thereof are smaller than the radius of a circle. Consequently, the line segments are concentrated along the inside of the circle, and do not exist at the center of the circle. Although the presence of the circle can be also detected in this case, the center thereof is difficult to detect.

Figure 3A:
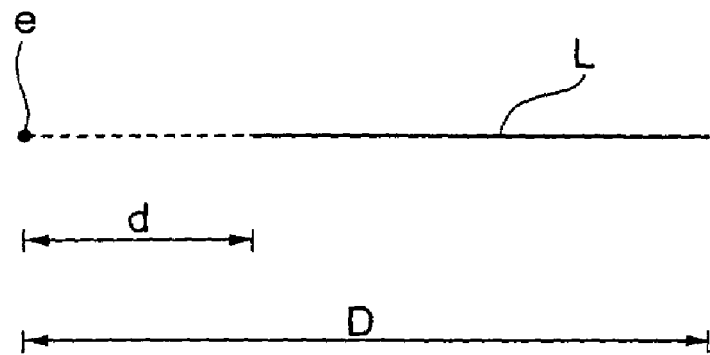
FIG. 3a explains a method of drawing a line segment.
Figure 3B:
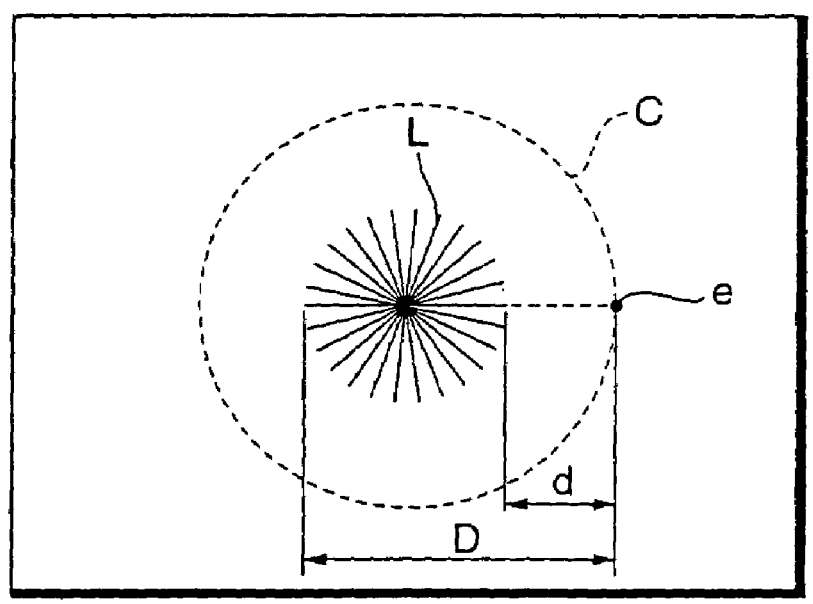
FIGS. 3b to 3d illustrate examples of a produced line segment image.
Figure 3C:
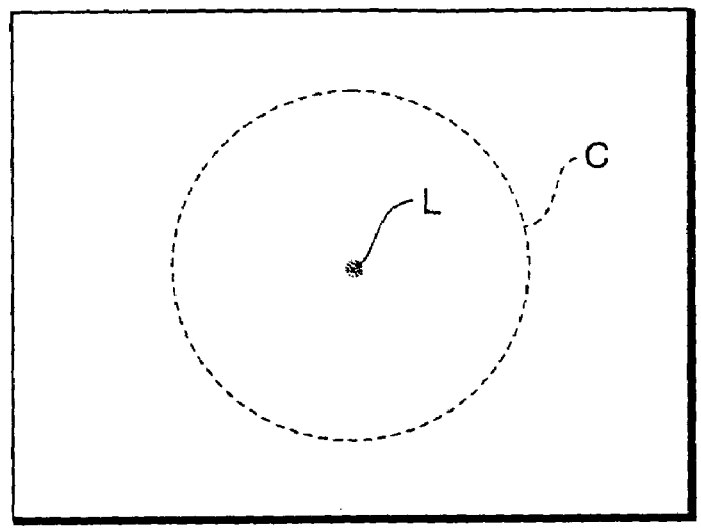
Figure 11D:
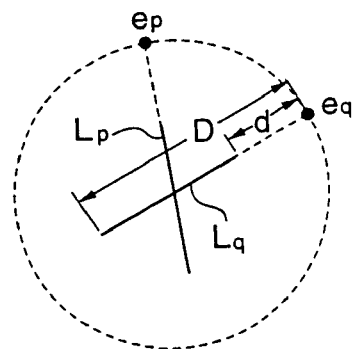

In FIG. 11d, the distance d from a pixel $e_q$ to the initial point of a line segment $L_q$ is smaller than the radius of a circle, and the distance D from the pixel $e_q$ to the terminal point of the line segment $L_q$ is larger than the radius of the circle and smaller than the diameter of the circle. In this case, the line segments are concentrated in the vicinity of the center of the circle. With respect to a pixel at which the line segments are overlapped with one another, if the luminance levels of all the line segments passing through the pixel are added (accumulated), since the largest number of line segments are overlapped with one another at the center of the circle, a value obtained by the addition is the largest at the center of the circle. The maximum level of the value obtained by the addition is detected, thereby making it possible to detect the center of the circle. This is the same as that previously described using FIG. 3b.

Consequently, the positional relationship (the distance d) between a pixel and the initial point of a line segment and the length (the distance D) of the line segment must be set (determined) in advance depending on the size of a void which should be judged to be defective.

It is possible to detect the void merely depending on whether or not there are line segments (the degree of density) without adding the luminance levels of the line segments passing through each of pixels. That is, it is judged that the higher the number of pixels at which the line segments are drawn in a local area (for example, 10 pixels by 10 pixels) is, the more highly the line segments are concentrated.

Such an idea can be utilized for applications of extracting only an object having a radius in a certain range when the object is approximately circular. For example, when it is desired to extract an object having a radius from a to b, values of a and b are entered from a keyboard. The image processing apparatus sets the distance from the position of a pixel to the initial point of a line segment to a (d=a), and sets the distance from the position of the pixel to the terminal point of the line segment to b (D=b). Consequently, concentration of line segments appears so long as the radius of the object is from a to b. If the density of the line segments can be detected, therefore, it can be judged that an object exists in the place where the line segments are concentrated.

The distances d and D can be also set to the same value. In this case, the length of the line segment is zero. Actually, only one pixel is a line segment. Consequently, line segments (points) are concentrated in a very narrow region in the case where the object is a circle whose radius has a set value (d=D), while being dispersed in the other cases. Therefore, it is possible to know the degree of an error from a target radius of the circle or the degree of out of roundness from the degree of the dispersion.

Figure 3D:
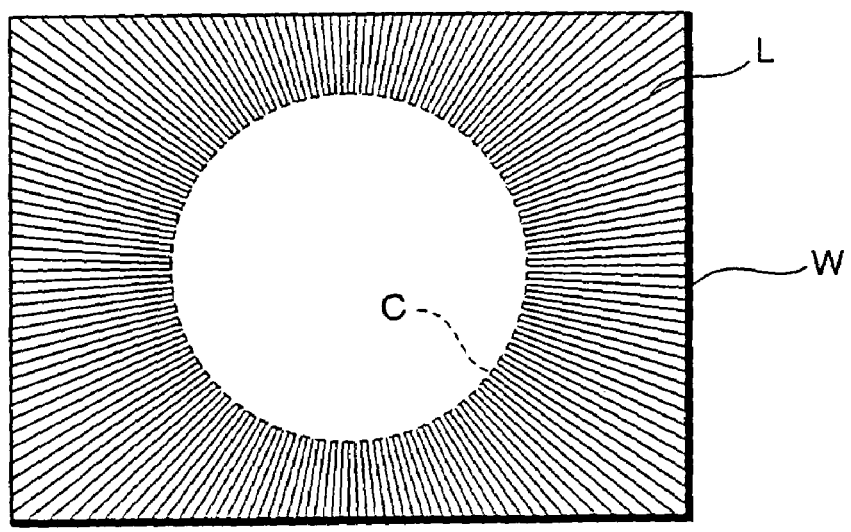

The distance D from the pixel to the terminal point of the line segment may be infinite. This actually means that a line segment is drawn until it reaches an end of a region represented by a line segment image memory. If d=0 and D=∞ are taken as default values, it is possible to detect that there exists a circle or a circular arc irrespective of the radius. Particularly as shown in FIG. 3d, it is effective for a case where a line segment is drawn toward the outside of a circle.

In the present embodiment, the distance D from the position of the pixel to the terminal point of the line segment and the distance d from the position of the pixel to the initial point of the line segment are set as inspection conditions on the basis of the above-mentioned principle, thereby detecting a void whose size is not less than a predetermined value as a detection object. The inspection can be also performed again by changing the inspection conditions as required.

Figure 12A:
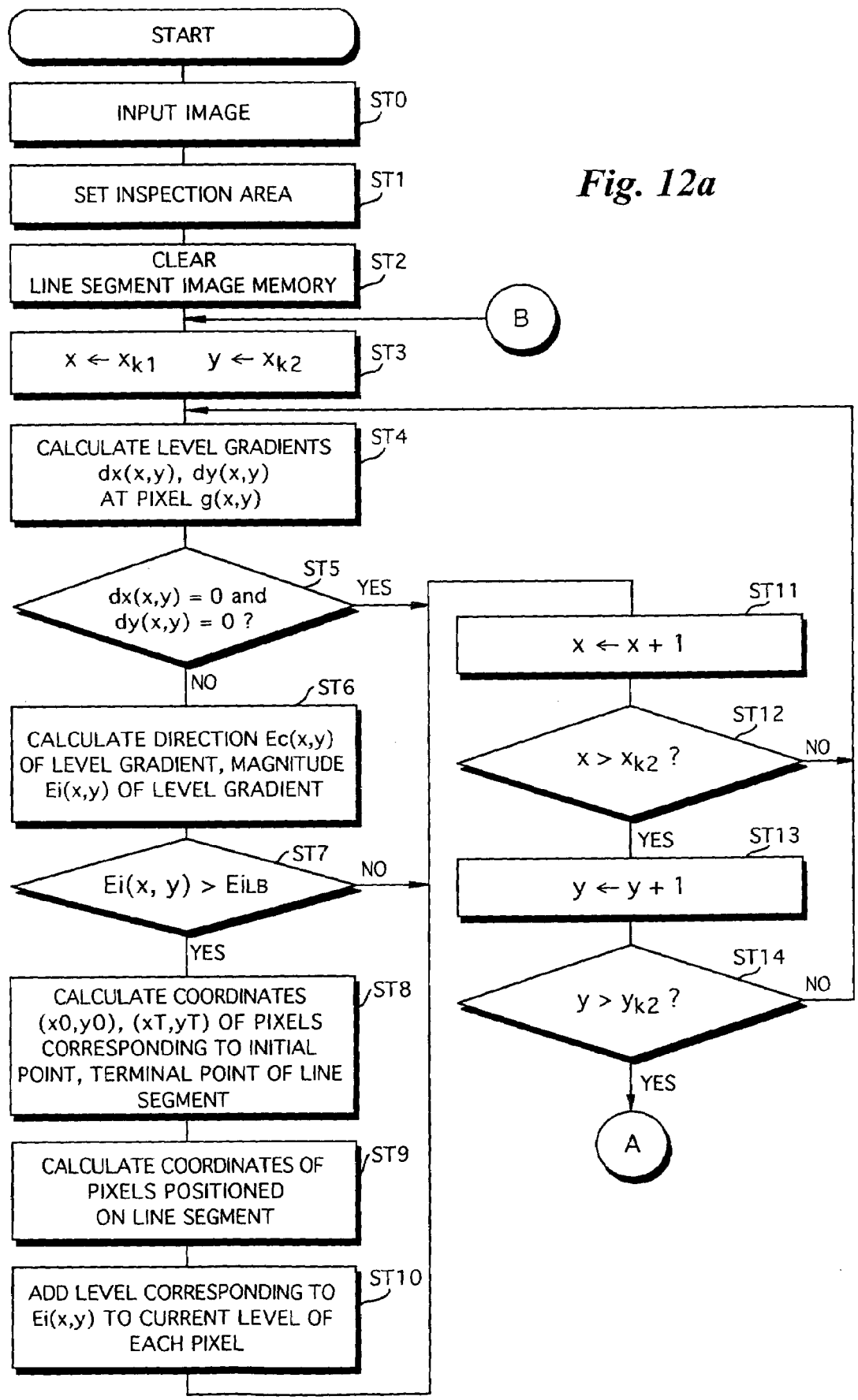
FIGS. 12a and 12b are flow charts showing the procedure for processing in an image processing apparatus.
Figure 12B:
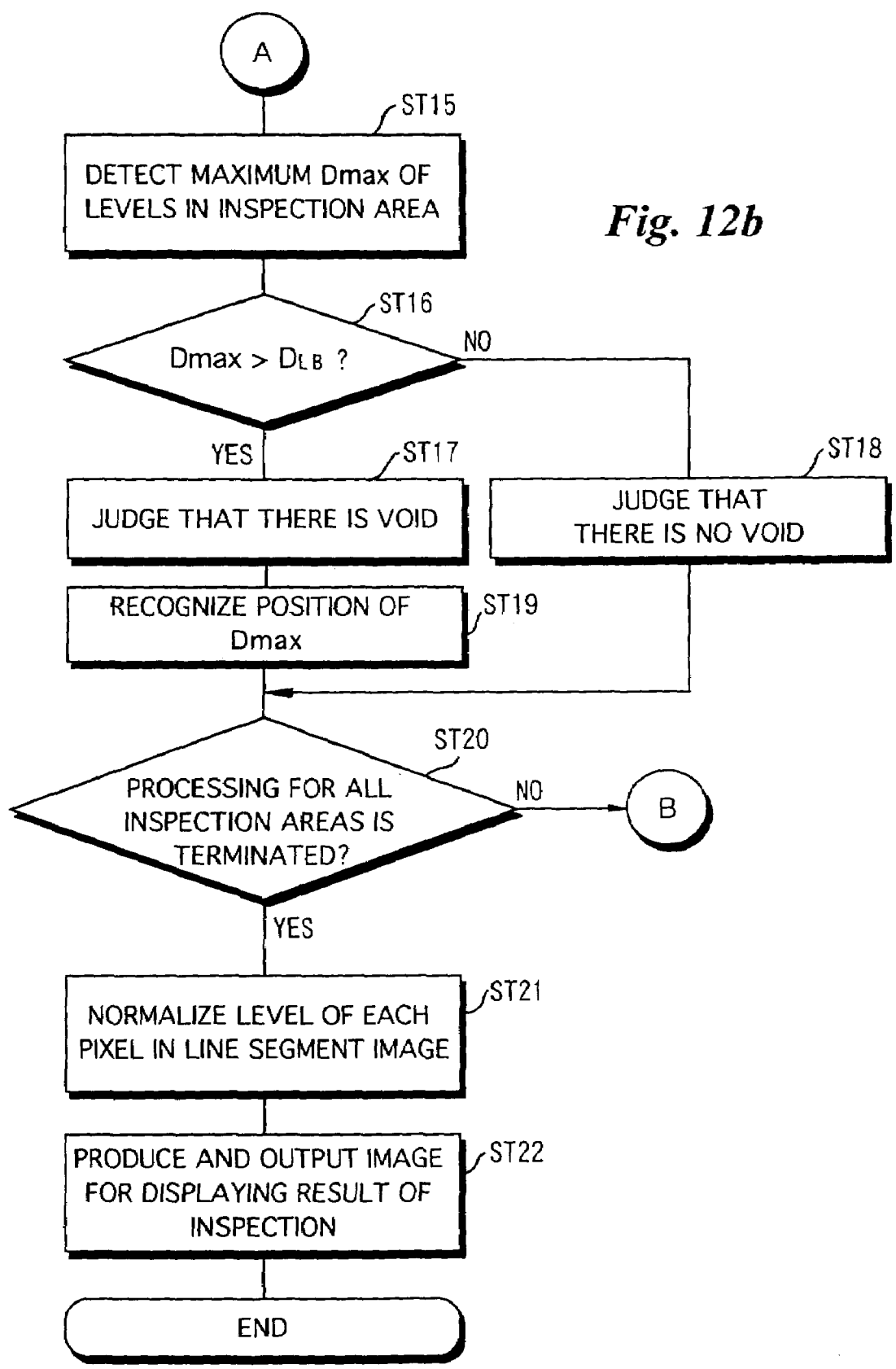

FIGS. 12a and 12b show the procedure for control of a frame of image inputted from the camera 20 in the image processing apparatus. The distance D from the position of a pixel to the terminal point of a line segment and the distance d from the position of the pixel to the initial point of the line segment which are to be inspection conditions shall be inputted prior to carrying out the procedure and stored in the RAM 9.

When an image signal from the camera 20 is stored in the image memory 3 upon being digitally converted at the step ST0, the CPU 7 displays the input image on the monitor display device 13 through the image output section 4.

An operator designates an inspection area so as to include arbitrary one of solder balls on a display image using the mouse or the like. The CPU 7 recognizes the position where the inspection area is set (a positional relationship relative to the solder ball) and the size of the region on the basis of the designated position. It is assumed that the position of each of the solder balls on a substrate (a position determined on the basis of the origin of coordinates on the substrate, for example) has been inputted previously or at this time point. The CPU 7 also sets, with respect to each of the solder balls other than that in the designated inspection area, the inspection area using the positional relationship between the solder ball and the inspection area (step ST1) (see FIG. 6). The position of the inspection area is represented by coordinates $(X_{k1}, Y_{k1})$ and $(X_{k2}, Y_{k2})$ at upper left and lower right vertexes of the region.

The CPU 7 proceeds to the step ST2. At the step ST2, level data representing each of pixels in the line segment image memory 5 is cleared to zero, and processing at the steps ST3 to ST19 is then repeatedly performed for each inspection area.

At the step ST3, the initial position of a target pixel (a pixel as to which level gradient is to be calculated) g is determined to be the position $(x_{k1}, Y_{k1})$ of the upper left vertex of the inspection area. At the step ST4, level gradients dx(x, y) and dy(x, y) along the X-axis and the Y-axis at the target pixel g are respectively calculated on the basis of the equations (1) and (2). When both dx and dy are zero, the steps ST6 to ST10 are skipped. If one of dx and dy is not zero, an angle $E_c(x, y)$ indicating the direction of the level gradient in accordance with any one, which is adapted to dx and dy, of the equations (4) to (9), and the magnitude $E_i(x, y)$ of the level gradient are calculated (step ST6).

It is then checked whether or not the calculated magnitude $E_i(x, y)$ of the level gradient is larger than a predetermined threshold $E_{iLB}$ (step ST7). If the magnitude $E_i(x, y)$ of the level gradient is not more than the threshold $E_{iLB}$, the processing at the steps ST8 to ST10 of forming a line segment is not performed. A line segment is not formed with respect to a level gradient which is not an object to be detected, for example, nonuniformity of luminance in an input image, thereby omitting useless processing, preventing an erroneous result of inspection from being obtained, and increasing the speed of processing as a whole.

The CPU 7 determines the direction $E_c(x, y)$ as the direction of a line segment in a counterclockwise direction at a position (x, y) of the target pixel g. In the set direction, points which are respectively spaced apart from the target pixel g by the distances d and D are set as the initial point and the terminal point of a line segment corresponding to the target pixel g, and coordinates $(x_0, y_0)$ and $(x_T, y_T)$ respectively corresponding to the points are recognized or calculated in the line segment image memory 5 (step ST8). The CPU 7 calculates or recognizes coordinates of all pixels on the line segment defined by the initial point and the terminal point in the line segment image memory 5 at the subsequent step ST9, and adds, for each of the recognized pixels, a level value corresponding to the magnitude $E_i(x, y)$ of the level gradient which is calculated at the step ST6 to a level value which is currently held by the pixel (stored in correspondence with the pixel) and stores the result of the addition (step ST10).

The steps ST11 to ST14 show processing for successively shifting a target position (pixel) of an image in the inspection area. For each of the pixels at which a level gradient has magnitude exceeding a threshold $E_{iLB}$ in the inspection area, a line segment along the direction of the level gradient and having a level corresponding to the magnitude of the level gradient is set, to produce a line segment image in the same manner as described above.

A value corresponding to the level of a line segment newly set is added to the level value of the pixel which is recognized to exist on the line segment in the line segment image memory 5. Accordingly, the pixel at which line segments are overlapped with one another has a higher level value than those of the other pixels. The larger the magnitude $E_i(x,y)$ of the level gradient is, the higher the level value of a line segment to be set is. Generally, the level gradient is large in the contour of a solder ball or a void on the image. Accordingly, a lot of line segments formed in a portion along the contour of the void are overlapped with one another inside the void, so that the level value of the pixel is significantly high inside the void.

The CPU 7 extracts, when it terminates processing for all the pixels in the inspection area which is a processing object, a maximum value $D_{max}$ of the levels of the pixels in the inspection area (step ST15). The maximum value $D_{max}$ of the detected levels is compared with a predetermined reference value $D_{LB}$ at the step ST16. When $D_{max}$ is above $D_{LB}$, it is judged that there is a void image in the inspection area, and the position of the pixel at which the maximum value $D_{max}$ of the levels is obtained is recognized (steps ST17 and ST19). When $D_{max}$ is not more than $D_{LB}$, it is judged that there is no void image in the inspection area (step ST18).

When processing for all the inspection areas is similarly terminated, the answer is in the affirmative at the step ST20. Thereafter, the program proceeds to the step ST21. The CPU 7 successively reads out the level values of the pixels in the line segment image memory 5, to normalize each of level values P(x, y) such that it is displaceable by an eight bit configuration.

$$P(x, y) \leftarrow P(x, y) \times 255/D_{max} \qquad \text{Eq. (10)}$$

Thereafter, the CPU 7 outputs normalized line segment image data, together with original input image data and text data representing the result of judgment, to the image output section 4 to perform synthesis processing, and outputs the result of the synthesis to the monitor display device 13 (step ST22). The contour of an object may be extracted and displayed.

Since at the step ST21, the line segment image data is normalized at the maximum luminance level $D_{max}$ for each of the inspection areas, the maximum luminances after the normalization are the same in all the areas. On the other hand, when the maximum luminance levels in all the inspection areas are detected, and image data in all the inspection areas are normalized using the maximum luminance levels, the luminance is low in the entire inspection area where no void exists, so that the inspection area looks dark. Accordingly, it is clearly found that there exists no void. Image data in all the areas may be, of course, normalized using a previously determined level, or may not be.

Although in the above-mentioned embodiment, each of the line segment images is caused to have a level value corresponding to the magnitude of its level gradient, the present invention is not limited to the same. For example, all the line segments may be represented at the same level. When a line segment corresponding to a level gradient by noises, for example, nonuniformity of luminance and a line segment corresponding to a level gradient in the contour are formed under the same conditions, however, erroneous detection may be performed. Accordingly, it is desirable that a level gradient whose magnitude is not more than a predetermined threshold as at the step ST7 is excluded from a line segment formation processing object.

Figure 13A:
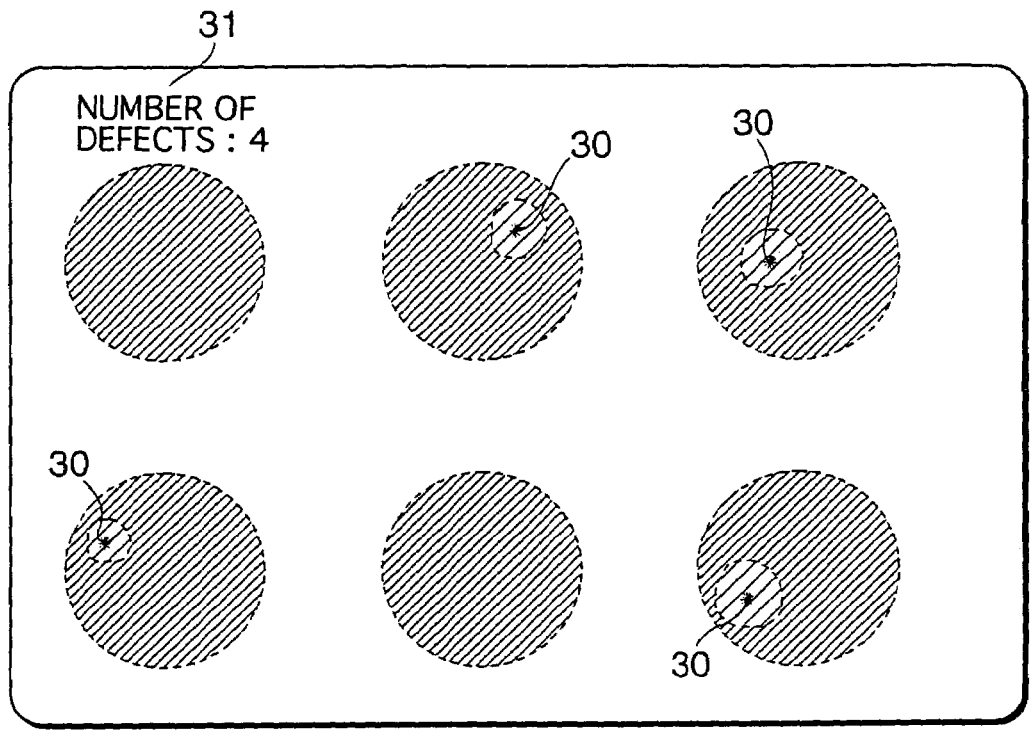
FIGS. 13a and 13b illustrate examples of display of the result of inspection.
Figure 13B:
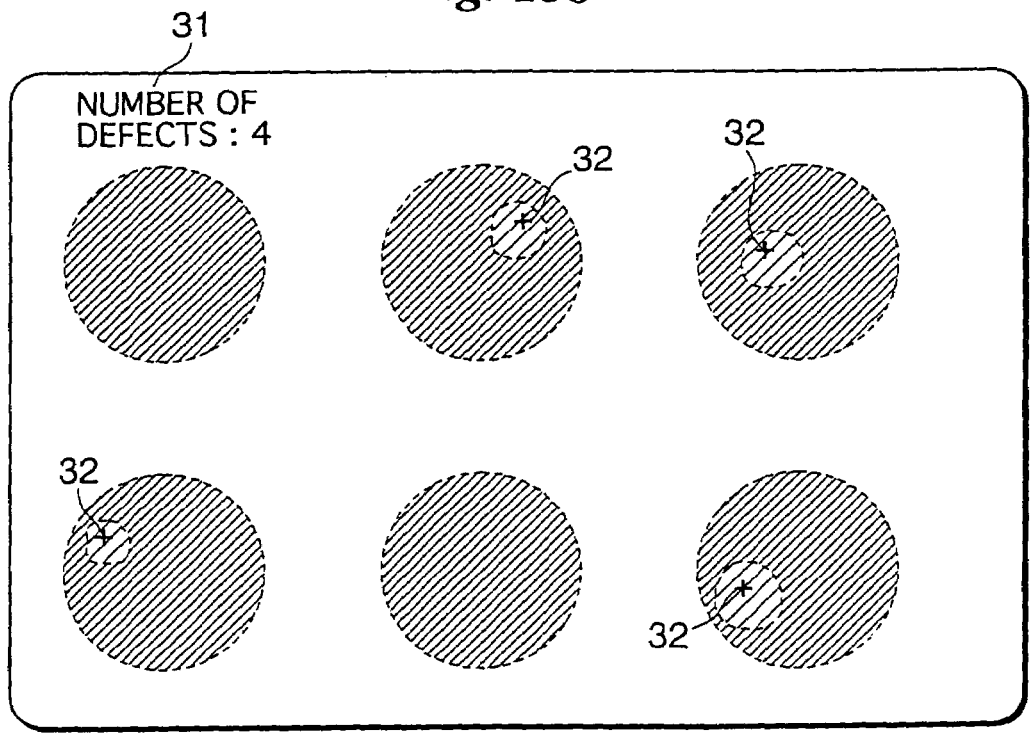

FIGS. 13a and 13b illustrate examples of display of the result of judgment which is made by the above-mentioned procedure for control. In the example shown in FIG. 13a, only an image 30 in a portion whose level value exceeds the threshold $D_{LB}$ is extracted from a line segment image, is so converted as to have a high luminance, and is displayed with the image superimposed on the original input image. Character information 31 representing the number of solder balls which are judged to be defective due to the presence of voids is displayed at an upper left position of a screen.

In the example of display shown in FIG. 13b, the position of an extracted void is reported. A mark 32 representing the position of a pixel at which the maximum level value $D_{max}$ is obtained by the processing at the step ST19 is displayed with the mark superimposed on an input image.

The example of display of the result of inspection is not limited to the foregoing. A line segment image itself may be displayed. Alternatively, the images shown in FIGS. 13a and 13b, an edge image, an image by a pixel satisfying $E_i(x, y) > E_{iLB}$, a line segment image, and the like may be displayed upon being suitably switched such that the process of inspection can be confirmed.

Although in the above-mentioned embodiment, an inspection area is set for each solder ball, the present invention is not limited to the same. For example, an inspection area may be set so as to include all solder balls on an image. In this case, the same processing as that at the steps ST4 to ST10 shown in FIG. 12a is performed once with respect to image data in the inspection area, a pixel having a level value exceeding the threshold $D_{LB}$ is then retrieved, and the position of the pixel is collated with the position where each of the solder balls is arranged, thereby making it possible to recognize the solder ball having a void.

In the above-mentioned embodiment, the luminance level of a void which is a detection object is lower than the luminance level in its vicinity, so that each of the line segments is set toward the inside of the void. When an object having a luminance level higher than that in its vicinity, for example, a solder ball is a detection object, however, the line segment must be set outward.

Furthermore, if a total of three line segments are set by not only drawing a line segment in the direction in which the line segment should be set but also drawing line segments in directions at ±2 degrees from the direction in consideration of the effect of an error in gradient calculation processing, for example, it is possible to further improve the detection precision of an object.

Although in the above-mentioned embodiment, the presence or absence of a void inside a solder ball is inspected on the basis of an X-ray transmitting image of the solder ball, the same method as described above can be applied even when the presence or absence of a pinhole on the surface of a solder is detected using an image obtained by picking up a substrate under normal illumination.

Furthermore, an inspection object is not limited to one in a circular shape. For example, when line segments are set by the same method as that in the above-mentioned embodiment with respect to an object having a contour shape only a part of which is a circular arc, the line segments to be formed are overlapped with one another in the vicinity of the position of the center of the circular arc. In a case where a corner of an article is chamfered in a round shape, when the above-mentioned processing is performed, letting d and D be respectively the minimum value and the maximum value of a tolerance for a chamfer radius, line segments are concentrated only when the chamfer radius is within the tolerance. Accordingly, the chamber radius can be simply inspected.

Figure 1A:
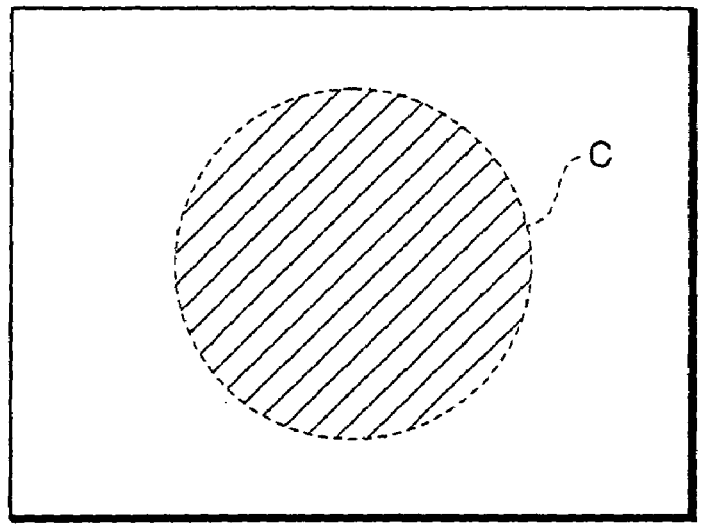
FIG. 1a illustrates an example of an object image.
Figure 1B:
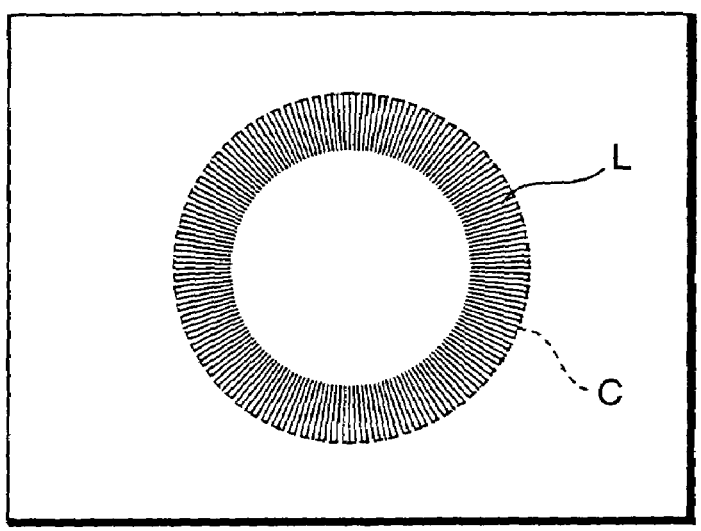
FIGS. 1b to 1d illustrate examples of a line segment image produced with respect to the object image.
Figure 1C:
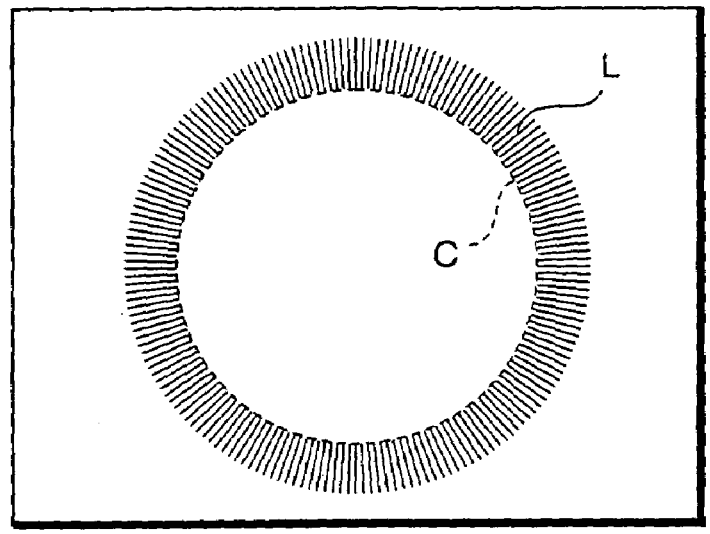
Figure 1D:
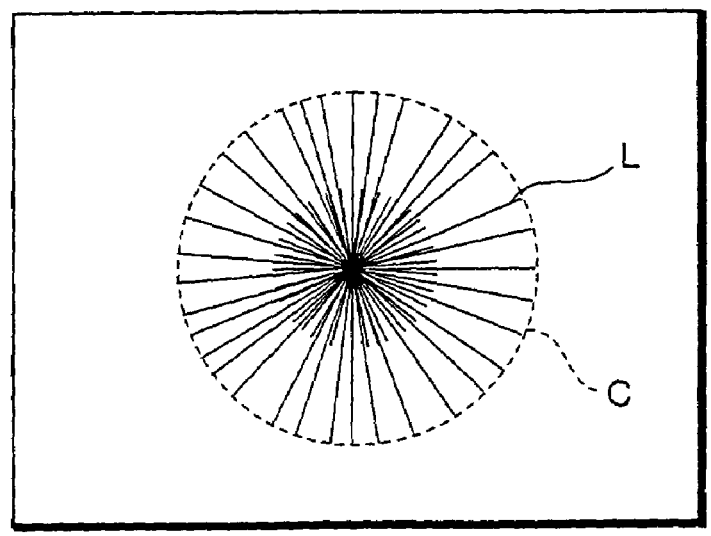
Figure 2A:
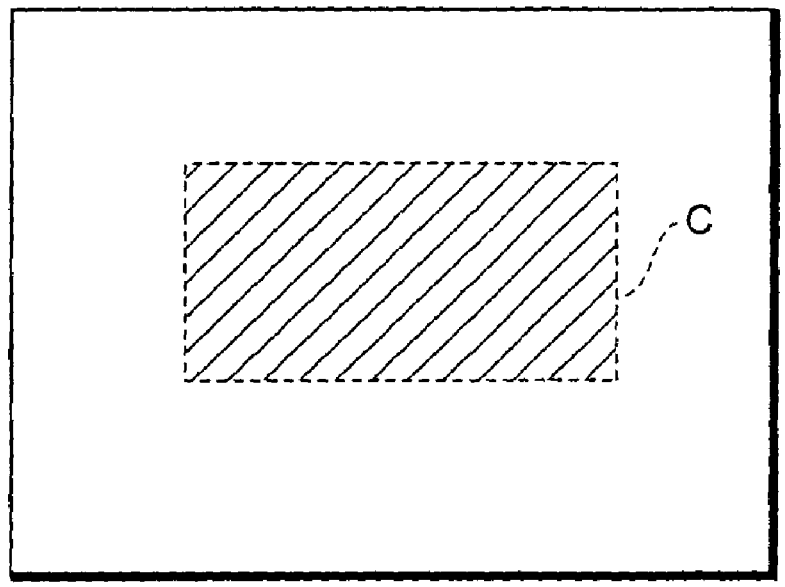
FIG. 2a illustrates another example of an object image.
Figure 2B:
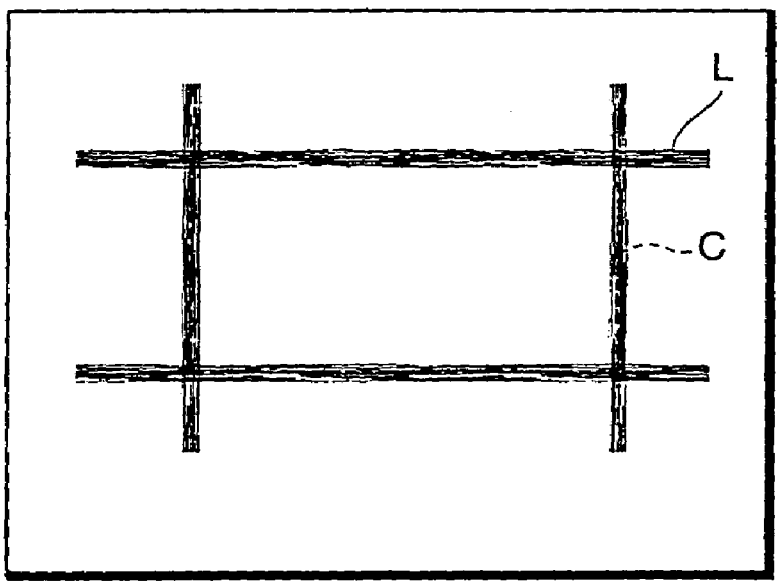
FIG. 2b illustrates an example of a line segment image produced with respect to the object image.

According to the image processing apparatus in the above-mentioned embodiment, it is also possible to extract an object having a rectangular contour shape and an object having corners. In this case, line segments directed in two directions perpendicular to the direction of the level gradient are formed, as shown in FIG. 2b, so that a point of intersection of the line segments is extracted as the position of the corner. When an object in a shape whose direction can be specified is taken as a processing object, therefore, it is possible to confirm not only the position of the object but also the direction in which the object is directed by the result of the processing.

Figure 14:
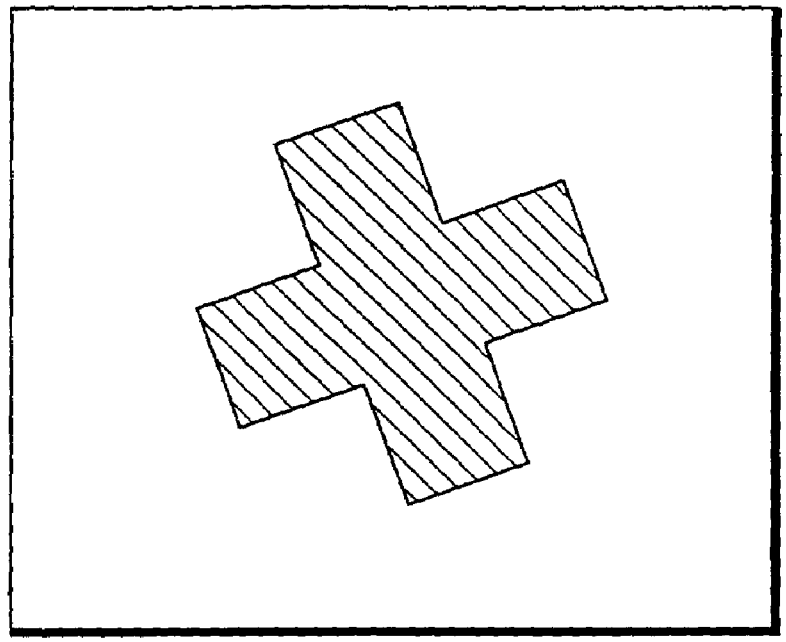
FIG. 14 illustrates an example of a gray level image of an object having a cross contour shape.

FIG. 14 illustrates an example of a gray level image of an object having a cross contour shape. The image of the object appears at a higher luminance level than that of an image of a background.

Figure 15:
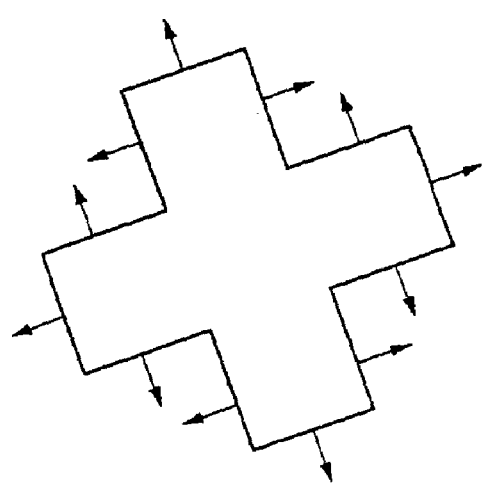
FIG. 15 illustrates an example of the directions of level gradients on the contours of an image with respect to the object shown in FIG. 14.

FIG. 15 illustrates the directions of level gradients calculated on the contours of the object shown in FIG. 14. The level gradient is directed perpendicularly to each of the sides and toward the background.

Figure 16:
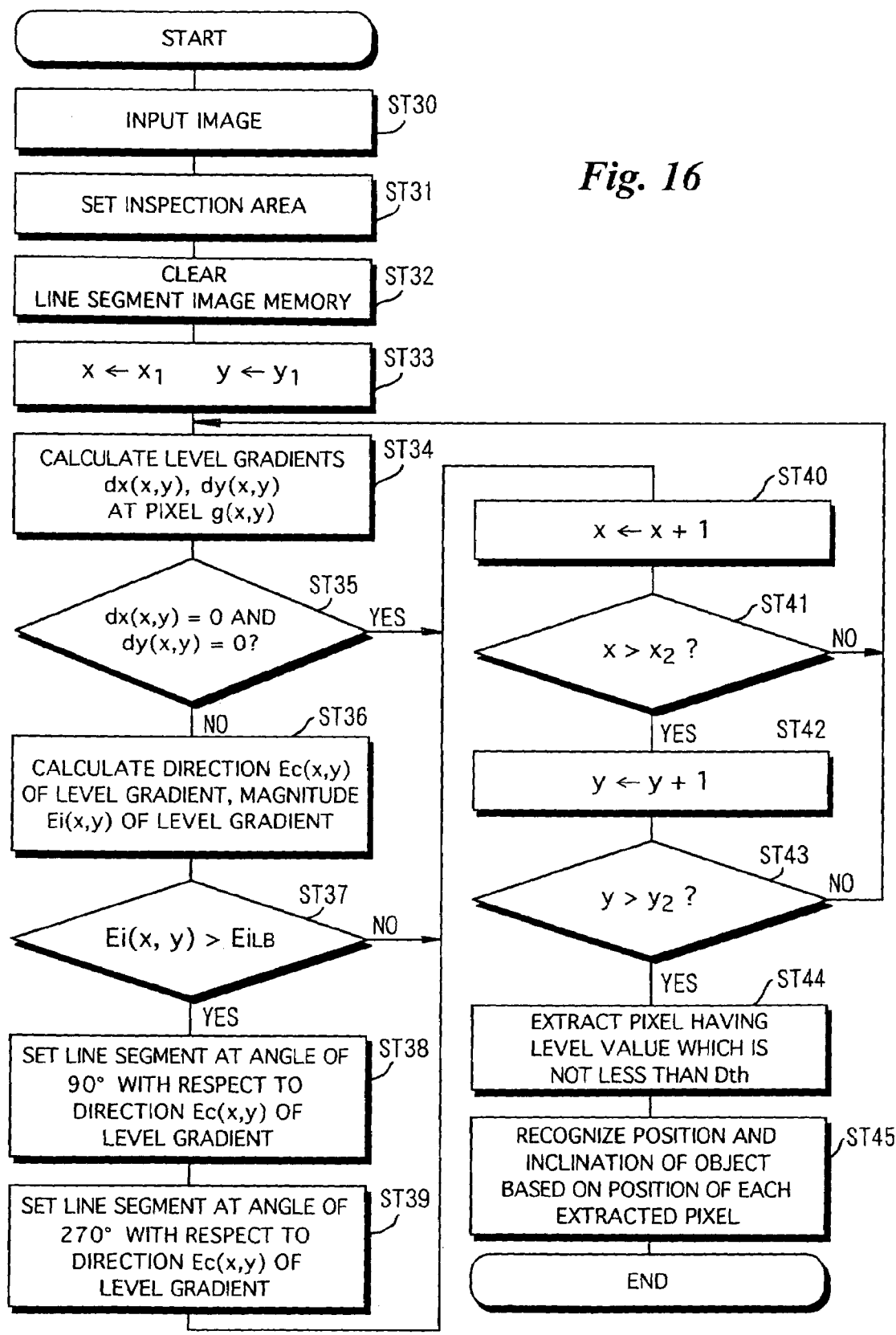
FIG. 16 is a flow chart showing another example of the procedure for processing in an image processing apparatus.
Figure 17:
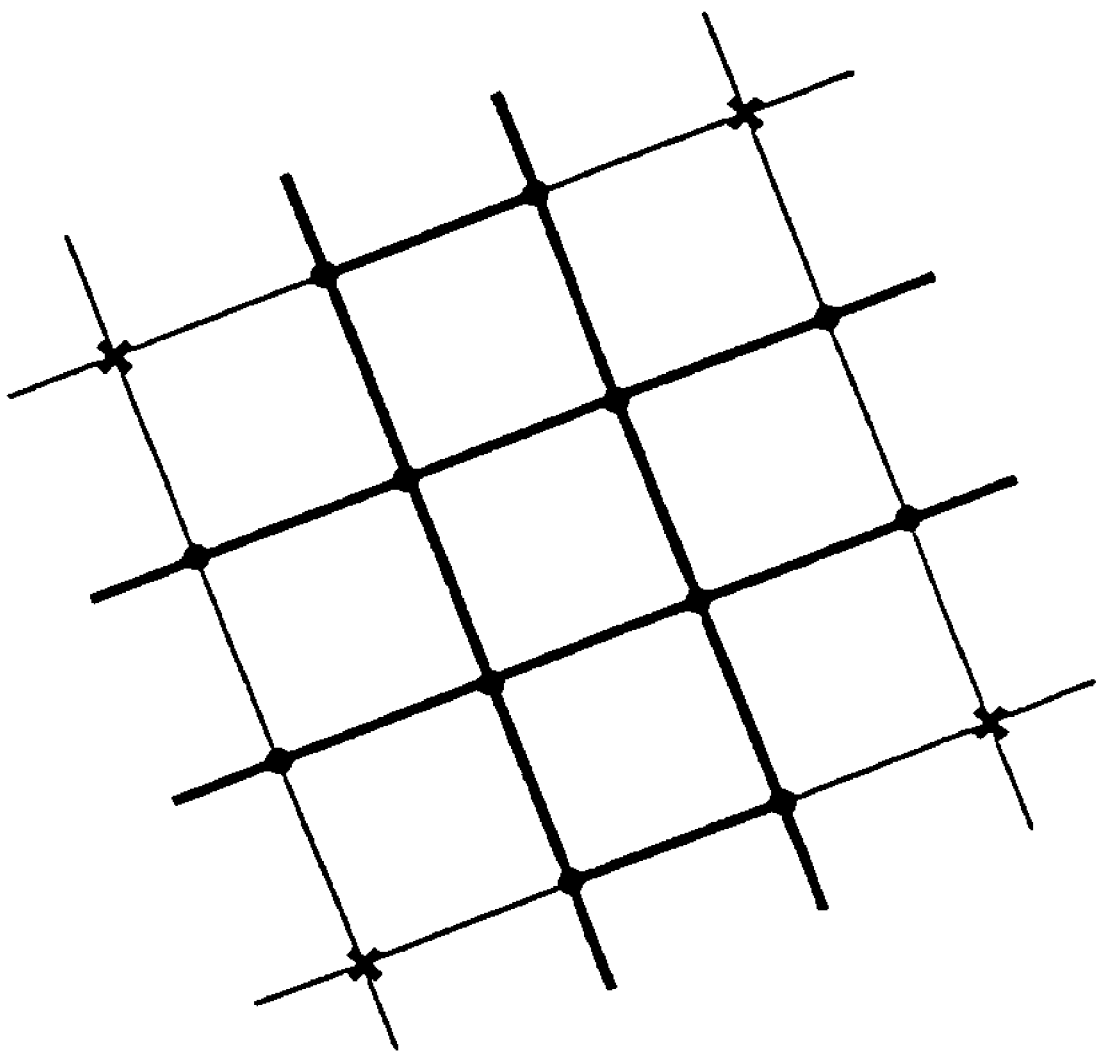
FIG. 17 illustrates the positions of points of intersection of line segments.

FIG. 16 shows the procedure for inputting the gray level image shown in FIG. 14 to the image processing apparatus shown in FIG. 5 and measuring the position and the inclination of an object. Image data obtained by picking up the object under normal illumination is fed to the image processing apparatus.

When image data from the camera is inputted at the step ST30, the CPU 7 accept designation of an inspection area on an image, fetches coordinates $(x_1, y_1)$ and $(x_2, Y_2)$ at upper left and lower right vertexes of the designated area, and recognizes the coordinates as set positions of the inspection area (step ST31), as in the procedure shown in FIG. 12a. The CPU 7 clears an area of each of pixels in the line segment image memory 5 at the subsequent step ST32, then successively pays attention to the pixels in the inspection area, and performs processing at steps ST34 to ST43 for each of the pixels.

In the above-mentioned loop, the CPU 7 calculates level gradients $dx(x, y)$ and $dy(x, y)$ in the X-direction and the Y-direction of a target pixel $g(x, y)$, as in the procedure shown in FIGS. 12a and 12b. The direction $E_c(x, y)$ of a level gradient and the magnitude $E_i(x, y)$ of the level gradient are calculated for each of the pixels (steps ST34 to ST36). If the calculated magnitude $E_i(x, y)$ of the level gradient is larger than a threshold $E_{iLB}$ (step ST37), a first line segment is set in a direction at an angle of 90 degrees in a counterclockwise direction with respect to the detected direction $E_c(x, y)$ of the level gradient at the step ST38. Further, a second line segment is set in a direction at an angle of 270 degrees in a counterclockwise direction with respect to the direction $E_c(x, y)$ of the level gradient at the step ST39.

The processing for setting each of the line segments at the steps ST38 and ST39 is performed in the same procedure as that at the steps ST8 to ST10 shown in FIG. 12a.

When processing of all the pixels in the inspection area is completed (steps ST40 to ST43), the CPU 7 checks the level value of each of the pixels in the line segment image memory 5, and extracts the pixel having a level value which is not less than a predetermined threshold $D_{th}$ in the inspection area (step ST44).

When with respect to the object on the gray level image shown in FIG. 14, line segments are set in two directions perpendicular to the direction of its level gradient, a line segment images of the line segments which are overlapped with one another are produced along the length of sides constituting the contour of the object. In this case, the largest number of lines are concentrated at 12 points of intersection (indicated by ● in the drawing) corresponding to the corners of the object out of 16 points of intersection formed by the line segments in the respective directions. Accordingly, the above-mentioned threshold $D_{th}$ is set between a level value obtained at each of the points of intersection and the other points of intersection (indicated by×in the drawing), thereby making it possible to detect pixels respectively corresponding to the corners of the object at the step ST44.

When the pixels respectively corresponding to the corners of the object are thus detected, the CPU 7 calculates the coordinates of a representative point representing the position, for example, the center of gravity, of the object using the coordinates of each of the detected positions, specifies principal axes (two axes) of the object from the positional relationship between the detected positions, and calculates the direction of each of the axes in the subsequent step ST45.

Thereafter, the result of the calculation is outputted to the monitor display device 13, and the shift in the position and the shift in the rotation of the image are recognized from the result of the calculation. Accordingly, processing corresponding to a purpose, for example, detailed recognition processing of the object is performed.

Although all the processing shown in FIG. 12a, the processing shown in FIG. 12b, and the processing shown in FIG. 16 are performed upon directly accepting an image produced by a camera in the image processing apparatus, the present invention is not limited to the same. For example, it is also possible to input digital image data produced at a distance through the I/O port 14 and process the inputted digital image data.

The processing shown in FIG. 12a, FIG. 12b, and FIG. 16 is performed by the CPU 7 on the basis of a control program installed in the hard disk 10. If a part of the processing is performed by hardware, however, the speed of the processing can be further increased by reducing the burden on the CPU 7.

Figure 18:
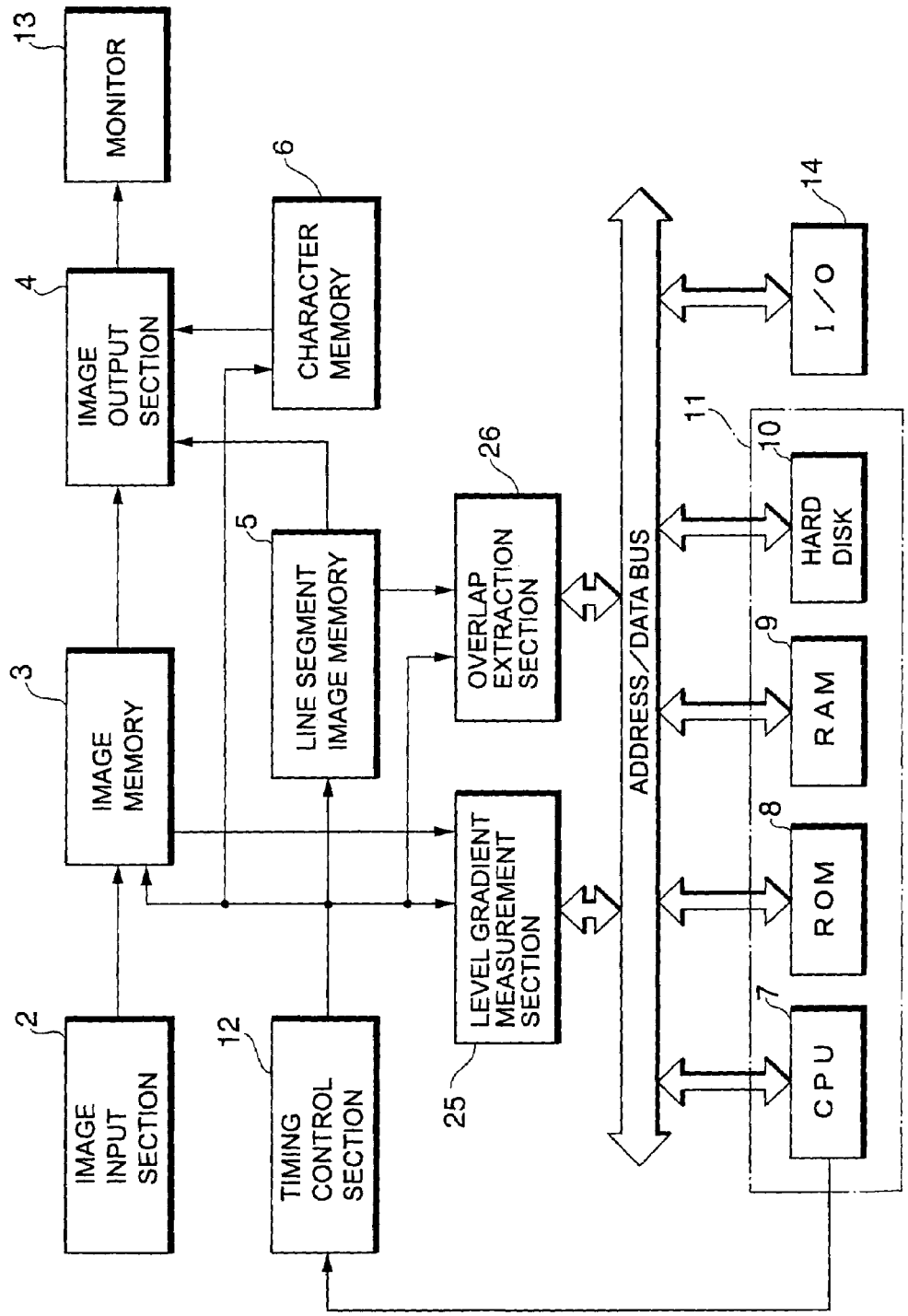
FIG. 18 is a block diagram showing another example of the electrical configuration of an image processing apparatus.

FIG. 18 illustrates another example of the configuration of an image processing apparatus, where a level gradient measurement section 25 and an overlap extraction section 26 are added in addition to the configuration shown in FIG. 5.

The level gradient measurement section 25 comprises a differential processing circuit for successively accepting pixel data on an input image stored in the image memory 3 and calculating level gradients $dx(x, y)$ and $dy(x, y)$ in the X-direction and the Y-direction and an operation circuit for calculating from the level gradients $dx(x, y)$ and $dy(x, y)$ the magnitude $E_i(x, y)$ of the level gradient and an angle $E_c(x, y)$ indicating the direction of the level gradient. The overlap extraction section 26 comprises a circuit configuration for successively accepting pixels in the line segment image memory 5, extracting the pixel having the maximum value of the luminance level, and comparing the maximum value with a threshold $D_{BL}$ or a threshold $D_{th}$.

The CPU 7 calculates the magnitude of the level gradient and the direction of the level gradient in an inspection area using the level gradient measurement section 25, and then sets a line segment in a direction corresponding to the shape of an object to be inspected with respect to a level gradient whose magnitude is not less than a predetermined value, using the result of the calculation. When the line segment formation processing is completed, the overlap extraction section 26 is operated, to retrieve an overlap of line segment images, and the CPU 7 performs judgment of the presence or absence of the object and measurement processing of the position and the inclination depending on the result of the retrieval.

The configuration of the image processing apparatus is not limited to that in the above-mentioned embodiment. For example, the line segment image production processing can be also performed by hardware.

The invention claimed is:

1. An image processing apparatus for processing image data including a plurality of pixels each of which has level data, said image processing apparatus comprising:
gradient calculation means for calculating at least a direction of the level gradient of each of a plurality of processing units in said image data to be processed;
line segment formation means for producing a line segment image which is distinguished from an image represented by said image data, by forming a plurality of line segments each of which comprises a plurality of pixels and has a line segment length L and a direction corresponding to the direction of the level gradient calculated by said gradient calculation means, the line segment formation means including means for setting said length L; and
a line segment image storage means for storing the line segment image produced by said line segment formation means.

2. The image processing apparatus according to claim 1, further comprising image storage means for storing said given image data.

3. The image processing apparatus according to claim 1, further comprising image data extraction means for extracting image data in a processing region set in input image data and feeding the extracted image data to said gradient calculation means.

4. The image processing apparatus according to claim 3, further comprising means for setting said processing region.

5. The image processing apparatus according to claim 1, wherein said line segment formation means produces line segment image at a gray level.

6. The image processing apparatus according to claim 1, wherein said line segment formation means produces line segment image at a binary level.

7. The image processing apparatus according to claim 1, wherein said gradient calculation means calculates a magnitude of the level gradient in addition to the direction of the level gradient.

8. The image processing apparatus according to claim 1, wherein said gradient calculation means calculates a magnitude of the level gradient in addition to the direction of the level gradient, and
said line segment formation means produces said line segment image having a level corresponding to the magnitude of the level gradient which is calculated by said gradient calculation means.

9. The image processing apparatus according to claim 1, wherein
said gradient calculation means calculates a magnitude of the level gradient in addition to the direction of the level gradient, and
said line segment formation means produces said line segment image only when the magnitude of the level gradient which is calculated by said gradient calculation means is not less than a predetermined threshold.

10. The image processing apparatus according to claim 1, wherein said line segment image storage means adds new line segment image to line segment image already stored at each of the pixels, and stores the result of the addition.

11. The image processing apparatus according to claim 1, wherein said line segment image storage means stores new line segment image without subjecting the line segment image to addition processing.

12. The image processing apparatus according to claim 1, wherein said line segment formation means produces a line segment having line segment length L in a direction corresponding to the calculated direction of the level gradient from the position of the processing unit.

13. The image processing apparatus according to claim 1, wherein said line segment formation means produces, when a distance from a position of the processing unit to an initial point and a distance from the processing unit to a terminal point are specified, a line segment from said initial point to said terminal point in a direction corresponding to the calculated direction of the level gradient.

14. The image processing apparatus according to claim 12, further comprising means for setting the length of the line segment.

15. The image processing apparatus according to claim 13, further comprising means for setting at least one of the distance from the processing unit to the initial point and the distance from the processing unit to the terminal point.

16. The image processing apparatus according to claim 1, further comprising means for detecting a portion of the given image data to be processed where line segments represented by the line segment image stored in said line segment image storage means are concentrated.

17. The image processing apparatus according to claim 1, further comprising means for detecting the position of the pixel having the maximum of the levels of the line segment image stored in said line segment image storing means.

18. The image processing apparatus according to claim 17, further comprising means for judging whether or not said maximum level exceeds a predetermined threshold.

19. The image processing apparatus according to claim 1, further comprising image input means having a camera for producing image data and feeding the produced image data to said gradient calculation means.

20. The image processing apparatus according to claim 1, further comprising a display device for displaying a line segment image represented by the line segment image produced by said line segment formation means or the line segment image stored in said line segment image storage means.

21. The image processing apparatus according to claim 20, wherein said display device displays an image represented by said given image with the image overlapped with said line segment image.

22. The image processing apparatus according to claim 20 further comprising means for extracting an edge of the image represented by said given image data to be processed, said display device displaying an image represented by the extracted edge with the image overlapped with said line segment image.

23. The image processing apparatus according to claim 16, further comprising a display device for displaying a mark representing the portion, where the line segments are concentrated, detected by said detection means with the mark overlapped with the image represented by said image data.

24. The image processing apparatus according to claim 17, further comprising a display device for displaying, at the position of the pixel having the maximum level which is detected by said detection means, a mark indicating that the pixel has the maximum level with the mark overlapped with the image represented by said image data.

25. The image processing apparatus according to claim 18, further comprising a display device for displaying, at the position of a pixel having the maximum level which is judged to exceed a threshold by said judgment means, a mark indicating that the pixel has the maximum level with the mark overlapped with the image represented by said image data.

26. The image processing apparatus according to claim 23, further comprising means for extracting an edge of the image represented by said image data, said display device displaying an image represented by the edge extracted by said edge extraction means in addition to or in place of the image represented by said image data.

27. The image processing apparatus according to claim 26, wherein said display device displays the line segment image with the line segment image further overlapped with the image represented by the edge.

28. An image processing apparatus for processing an image data including a plurality of pixels each of which has level data, said image processing apparatus comprising:
  an image processing means for calculating at least the direction of the level gradient of each of a plurality of processing units in given image data, and producing line segment image which is distinguished from an image represented from said image data including a line segment which comprises a plurality of pixels for each of the plurality of processing units, said image processing means including means for predetermining a line segment length L, the image processing means being arranged and configured to form line segments having said predetermined length L and a direction corresponding to the calculated direction of the level gradient for each image having a non-zero level gradient; and
  display means for displaying the line segment images produced by said image processing means.

29. The image processing apparatus according to claim 28, wherein said display means displays the image represented by said image data with the image overlapped with said line segment image.

30. The image processing apparatus according to claim 29, further comprising means for extracting an edge of the image data, said display means displaying an image represented by the edge extracted by said edge extraction means in addition to or in place of the image data.

31. An image processing method for processing an image data including a plurality of pixels each of which has level data, said image processing method comprising the steps of:
  calculating at least the direction of the level gradient of each of a plurality of processing units in given image data including a plurality of pixels, the pixels respectively having level data;
  providing a predetermined line segment length;
  producing line segment image which is distinguished from an image represented by said image data representing a line segment which comprises a plurality of pixels for each of the plurality of processing units, each line segment having said predetermined line segment length and a direction corresponding to the calculated direction of the level gradient for each pixel having a non-zero level gradient; and
  storing the produced line segment image in storage means.

32. A medium storing a program for controlling a computer to process an image data including a plurality of pixels each of which has level data, so as to:
  calculate at least the direction of the level gradient of each of a plurality of processing units in given image data including a plurality of pixels, the pixels respectively having level data;
  provide a predetermined line segment length;
  produce line segment image which is distinguished from an image represented by said image data representing a line segment which comprises a plurality of pixels for each of the plurality of processing units, each line segment having said predetermined line segment length and a direction corresponding to the calculated direction of the level gradient for each pixel having a non-zero level gradient; and
  store the produced line segment image in storage means.

33. An image processing method for processing an image data including a plurality of pixels each of which has level data, said image processing method comprising:
  calculating at least the direction of the level gradient of each of a plurality of processing units in given image data;
  providing a predetermined line segment length;
  producing line segment image which is distinguished from an image represented by said image data representing a line segment which comprises a plurality of pixels for each of the plurality of processing units, each line segment having said predetermined line segment length and a direction corresponding to the calculated direction of the level gradient for each image having a non-zero level gradient; and
  displaying line segment images represented by the produced line segment image on a display device.

34. A medium storing a program for controlling a computer to process an image data including a plurality of pixels each of which has level data, so as to:
  calculate at least the direction of the level gradient for each of a plurality of processing units in given image data,
  provide a predetermined line segment length, and
  produce line segment image which is distinguished from an image represented by said image data representing a line segment which comprises a plurality of pixels for each of the plurality of processing units, each line segment having said predetermined line segment length and a direction corresponding to the calculated direction of the level gradient for each processing unit having a non-zero level gradient; and
  display line segment images represented by the produced line segment image on a display device.

35. An image processing apparatus for processing an image data including a plurality of pixels each of which has level data, said image processing apparatus comprising:
  means for extracting a plurality of edges whose level gradients are not less than a predetermined value in said image data;
  means for providing a predetermined line segment length;
  means for setting, for each of the edges, a line segment which comprises a plurality of pixels extending said predetermined length in a direction corresponding to the direction of the extracted edge; and
  means for detecting the presence or absence of a point of intersection of a plurality of line segments and the position thereof.

36. The image processing apparatus according to claim 35, wherein the direction of the line segment is a direction perpendicular to the direction of the edge or the same direction as the direction of the edge.

37. An inspection apparatus comprising:
image input means for inputting image data representing an inspection object;
means for specifying a line segment length;
means for calculating at least the direction of the level gradient of each of a plurality of processing units in said input image data, and producing line segment image representing a line segment which comprises a plurality of pixels for each of the plurality of processing units, each line segment having said specified line segment length and a direction corresponding to the calculated direction of the level gradient; and
means for detecting the presence or absence of a portion where the line segments are concentrated or are overlapped with one another and the position thereof on the basis of the produced line segment image.

38. The inspection apparatus according to claim 37, wherein the direction corresponding to the direction of said level gradient is the direction of the level gradient or a direction perpendicular to the direction of the level gradient.

39. The inspection apparatus according to claim 38, further comprising a display device for displaying the line segment image.

40. The inspection apparatus according to claim 39, wherein said display device displays an image of the object represented by said input image data with the image overlapped with the line segment image.

41. The inspection apparatus according to claim 37, further comprising a display device for displaying the detected position of the portion where the line segment images are concentrated or are overlapped with one another on the image of the object represented by said input image data or an image represented by an edge extracted from said input image data.

42. The inspection apparatus according to claim 37, further comprising means for inputting data relating to the length of the line segment or an initial point and a terminal point of the line segment.

43. An image processing apparatus for processing an image data including a plurality of pixels each of which has level data, said image processing apparatus comprising:
a gradient calculator which calculates at least the direction of the level gradient of a processing unit in a given image data including a plurality of pixels, the pixels respectively having level data;
a line segment length provider which provides a line segment length;
a line segment former which produces line segment image representing a line segment which comprises a plurality of pixels having said line segment length and a direction corresponding to the direction of the level gradient which is calculated by said gradient calculation means; and
line segment image storage which stores the line segment image produced by said line segment formation means.

44. The image processing apparatus according to claim 8, further comprising means for detecting a level value of the line segment image data for each of the plurality of processing units in the given image.

45. The image processing apparatus according to claim 44, further comprising means for determining a concentration of level values in a processing region.

46. The image processing method according to claim 31, further comprising calculating a magnitude of the level gradient of each of the plurality of processing units in the given image data; and
producing the line segment image to include a level value corresponding to the magnitude of the level gradient.

47. The image processing method of claim 46, further comprising detecting a level value of the line segment image for each of the plurality of processing units in the given image.

48. The image processing method according to claim 47, further comprising determining a concentration of level values in a processing region.

49. The inspection apparatus of claim 37, wherein the means for calculating determines a magnitude of the level gradient of each of the plurality of processing units, and produces line segment image including level values corresponding to respective magnitudes of the level gradient.

50. The inspection apparatus of claim 49, wherein the means for detecting recognizes coordinates for all processing units on each line segment and calculates a level value held by processing units in a processing region.

51. An image processing apparatus for processing an image data including a plurality of pixels each of which has level data said image processing apparatus comprising:
gradient calculation means for calculating at least the direction of the level gradient of each of a plurality of processing units in given image data including a plurality of pixels, the pixels respectively having level data;
line segment formation means for producing line segment image representing a line segment which comprises a plurality of pixels for each of the plurality of processing units, the line segment formation means being arranged and configured to form line segments each having a respective given length L, and a direction corresponding respectively to the direction of each level gradient which is calculated by said gradient calculation means;
means for varying the given length L prior to forming said line segments; and
line segment image storage means for storing the line segment image produced by said line segment formation means.

52. An image processing apparatus for processing an image data including a plurality of pixels each of which has level data said image processing apparatus comprising:
gradient calculation means for calculating at least the direction of the level gradient of each of a plurality of processing units in given image data including a plurality of pixels, the pixels respectively having level data;
line segment formation means for producing line segment image representing a line segment which comprises a plurality of pixels for each of the plurality of processing units, each line segment having a given length and a direction corresponding respectively to the direction of each level gradient which is calculated by said gradient calculation means; and
line segment image storage means arranged and configured to store, for each respective pixel through which the line segment passes, the line segment image produced by said line segment formation means at said respective pixel.

53. The image processing apparatus of claim 52 wherein the line segment image includes a level, and the data stored includes a respective line segment level for at least one line segment passing through a respective pixel.

54. An apparatus configured and arranged to perform a plurality of types of image processing, including various types of image detection and image recognition, the apparatus comprising:

means for selecting between the plurality of types of image processing;

gradient calculation means for calculating at least the direction of the level gradient of each of a plurality of processing units in given image data including a plurality of pixels, the pixels respectively having level data;

line segment formation means for producing line segment image representing a line segment which comprises a plurality of pixels for each of the plurality of processing units, each line segment having a given length and a direction corresponding respectively to the direction of each level gradient which is calculated by said gradient calculation means;

means for setting a line segment length associated with a type of image processing selected; and line segment image storage means for storing the line segment image produced by said line segment formation means.

55. The apparatus according to claim 54, further comprising means for selecting the direction corresponding to the direction of each level gradient.

\* \* \* \* \*

UNITED STATES PATENT AND TRADEMARK OFFICE
CERTIFICATE OF CORRECTION

| | | |
|---|---|---|
| PATENT NO. | : 7,239,740 B1 | |
| APPLICATION NO. | : 09/445304 | |
| DATED | : July 3, 2007 | |
| INVENTOR(S) | : Shiro Fujieda | |

It is certified that error appears in the above-identified patent and that said Letters Patent is hereby corrected as shown below:

On Title Page
Item 22, column 1, PCT filing date: PCT Filed: should read --Apr. 7, 1999--

Signed and Sealed this

Sixth Day of November, 2007

JON W. DUDAS
*Director of the United States Patent and Trademark Office*